United States Patent [19]
Kikuchi et al.

[11] Patent Number: 6,064,776
[45] Date of Patent: May 16, 2000

[54] IMAGE PROCESSING APPARATUS

[75] Inventors: Yoshihiro Kikuchi; Toshiaki Watanabe, both of Yokohama; Takeshi Nagai, Tokyo; Kenshi Dachiku, Kawasaki, all of Japan

[73] Assignee: Kabushiki Kaisha Toshiba, Kawasaki, Japan

[21] Appl. No.: 08/740,125

[22] Filed: Oct. 24, 1996

[30] Foreign Application Priority Data

Oct. 27, 1995 [JP] Japan ................................ 7-280769
Oct. 27, 1995 [JP] Japan ................................ 7-280910
Oct. 27, 1995 [JP] Japan ................................ 7-280912

[51] Int. Cl.$^7$ .................................................. G06K 9/40
[52] U.S. Cl. ...................... 382/260; 382/261; 382/266; 348/400; 348/407
[58] Field of Search ............................ 382/260, 261, 382/262, 263, 264, 265, 266, 268, 254, 232, 239; 348/400, 403, 404, 407, 408

[56] References Cited

U.S. PATENT DOCUMENTS

| | | | |
|---|---|---|---|
| 4,827,338 | 5/1989 | Gerard ................................... | 348/408 |
| 5,146,326 | 9/1992 | Hasegawa ............................. | 348/405 |
| 5,229,864 | 7/1993 | Moronaga et al. .................... | 348/433 |

FOREIGN PATENT DOCUMENTS 0 585 573  3/1994  European Pat. Off. .
2 287 153  9/1995  United Kingdom .

OTHER PUBLICATIONS

Chung–Nan Tien, et al., SPIE Visual Communications and Image Processing, vol. 2094, No. Part 3, pp. 1627–1638, "Transform–Domain Postprocessing of DCT–Coded Images", Nov. 8, 1993.

*Primary Examiner*—Thomas D. Lee
*Attorney, Agent, or Firm*—Oblon, Spivak, McClelland, Maier & Neustadt, P.C.

[57] ABSTRACT

An image processing apparatus includes a flat domain decision unit that causes a segmentation unit to divide the decoded picture signal from a decoder into a plurality of small regions (blocks) and then causes a picture quality decision unit to decide whether or not the regions are flat domains region by region, an AC component prediction unit that predicts the AC component from the decoded picture signal, and a switch that outputs the AC component signal predicted by the AC component prediction unit for the blocks determined by the flat domain decision unit to be flat domains and also outputs the decoded picture signal as it is for the remaining blocks.

17 Claims, 13 Drawing Sheets

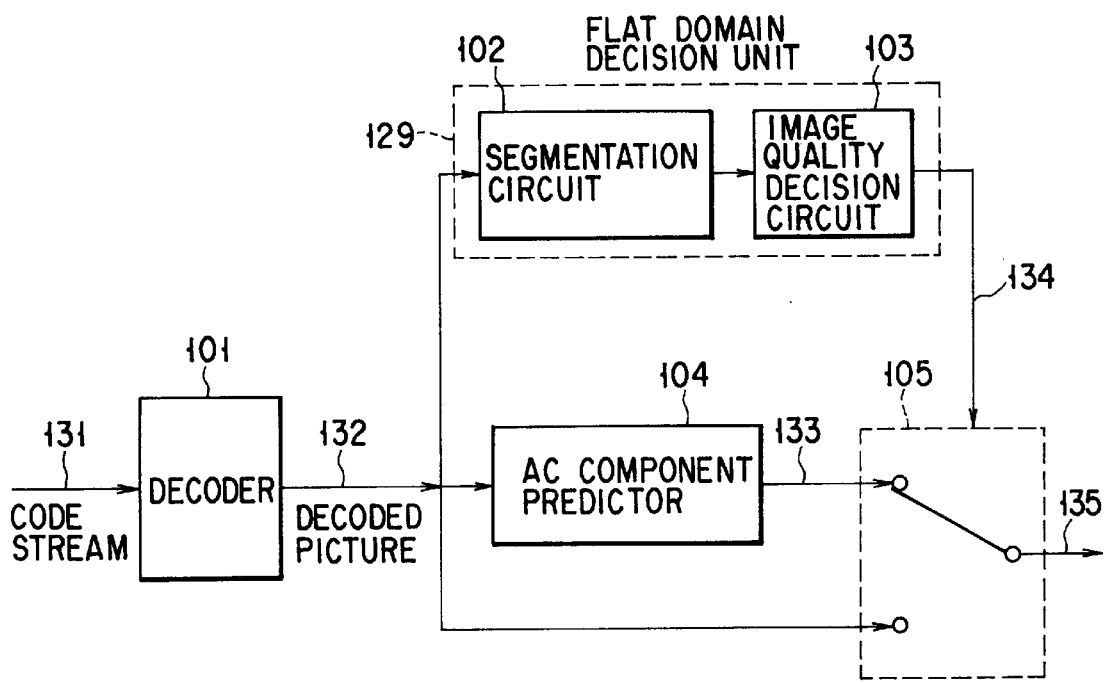
F I G. 1
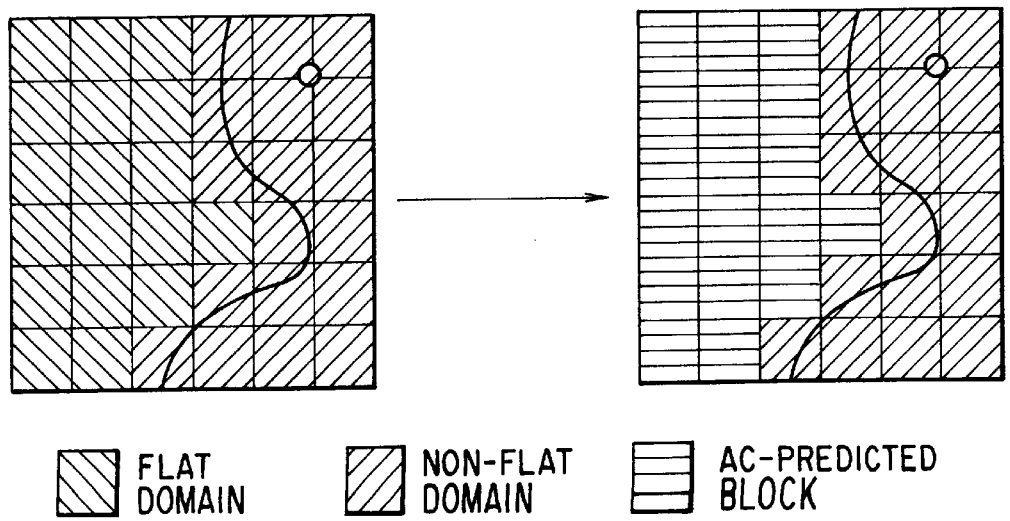
F I G. 2

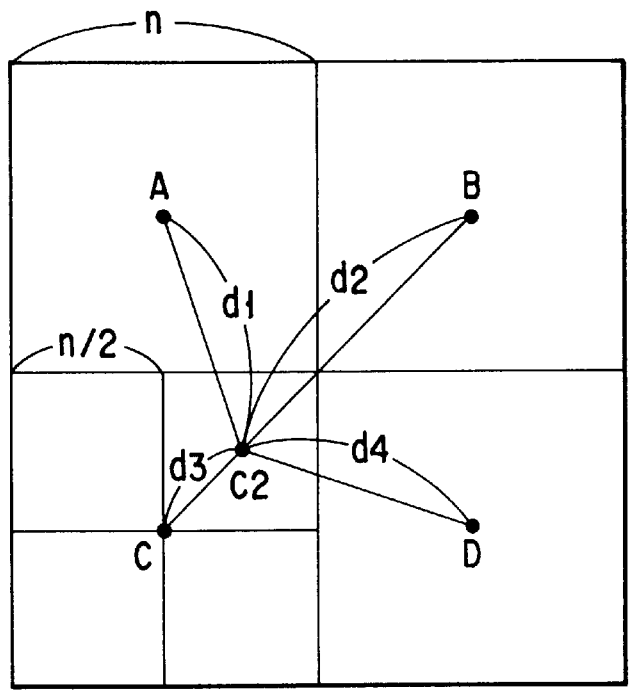
F I G. 3
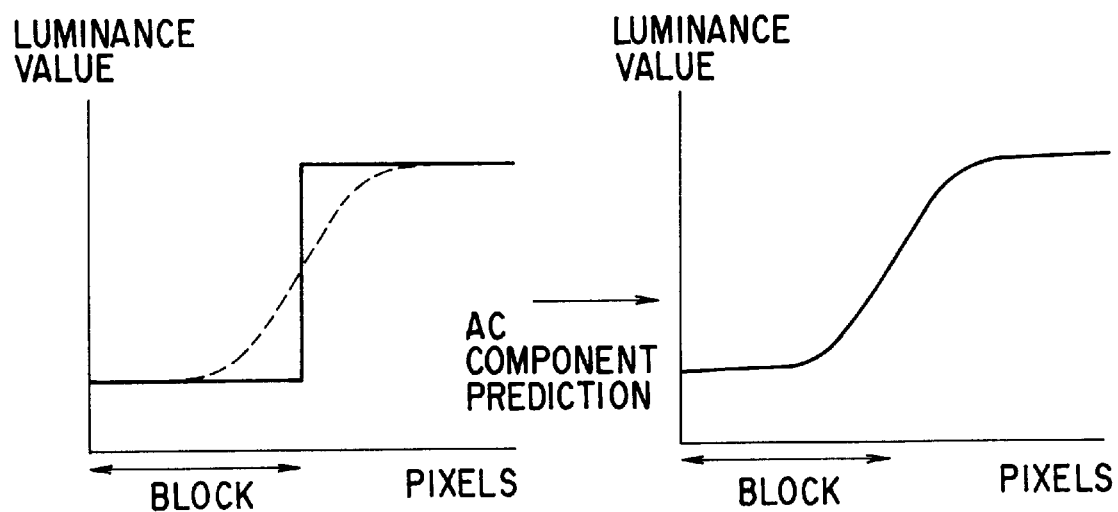
F I G. 4

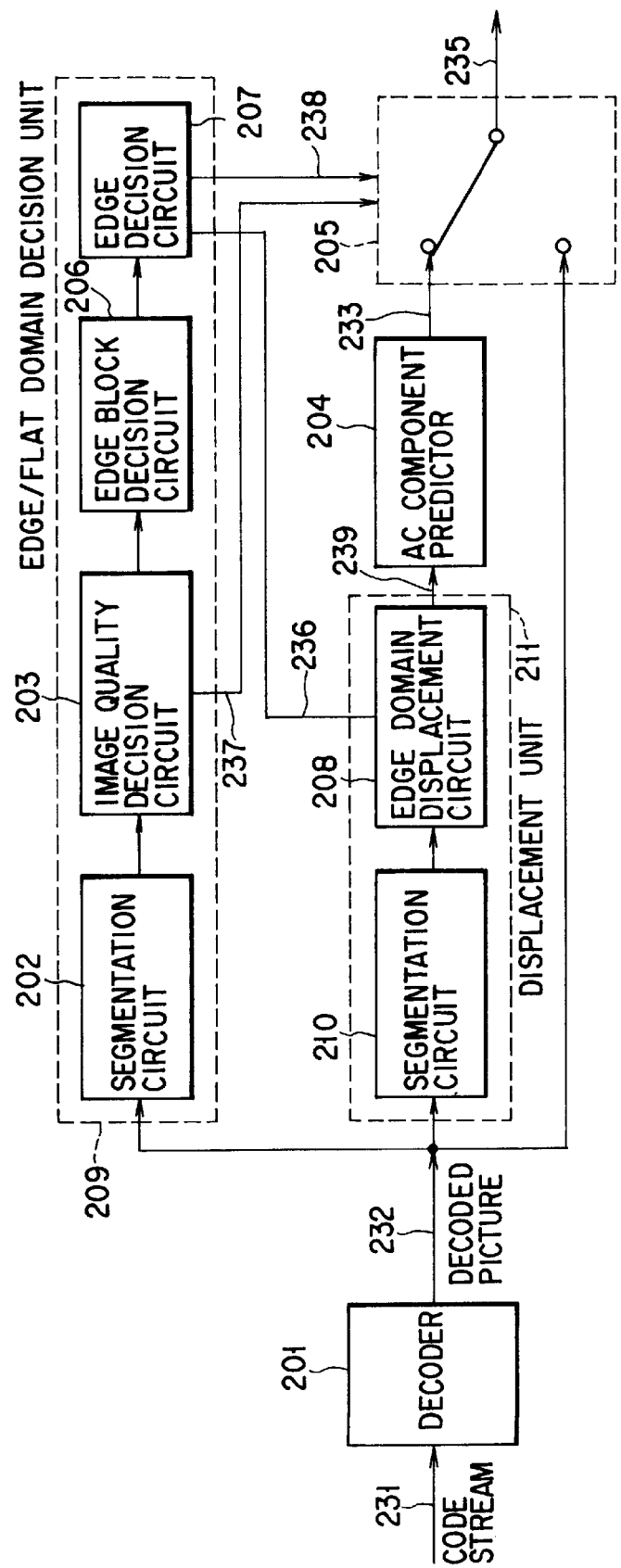
F I G. 5

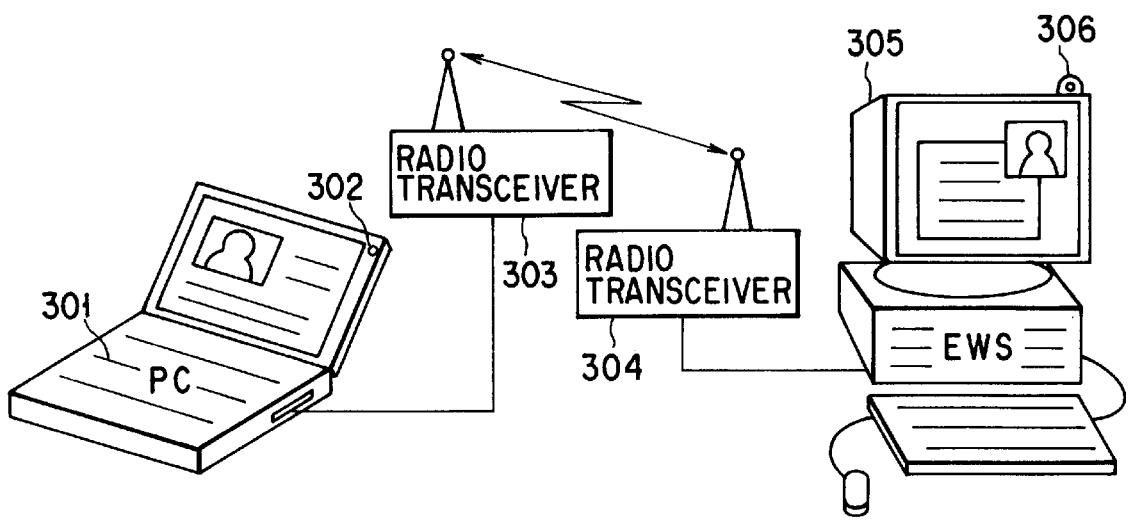
F I G. 9
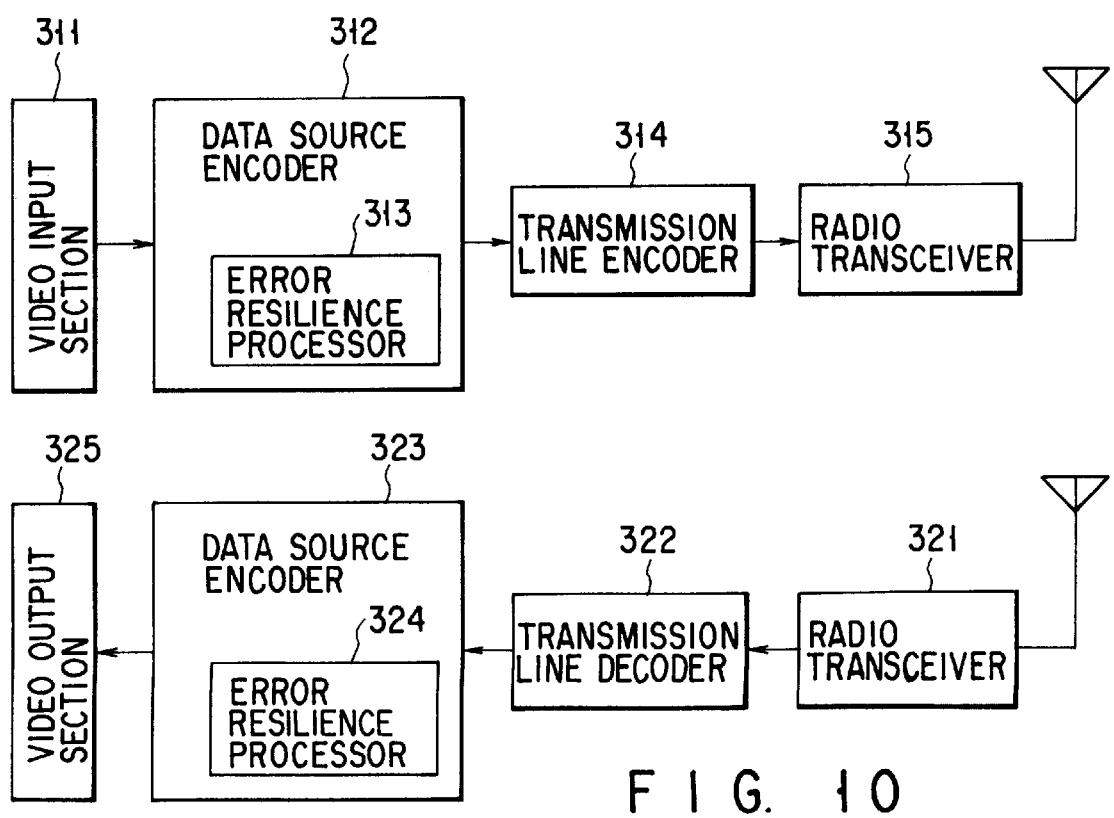
F I G. 10

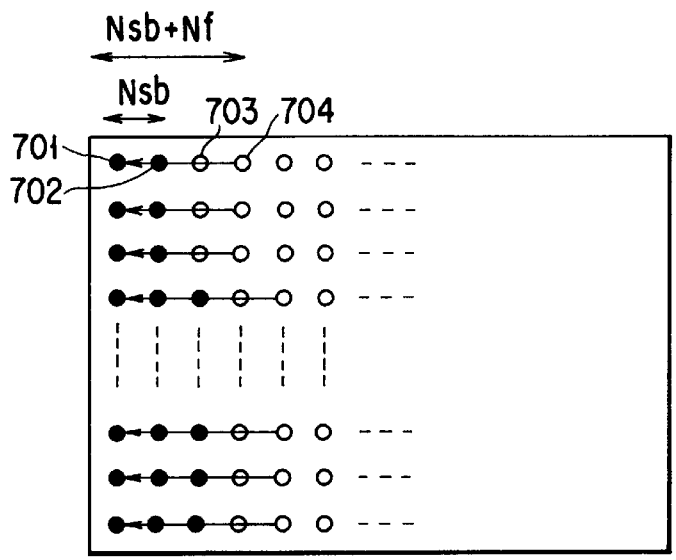
F I G. 21
- ● BLACK LEVEL PIXELS
- ○ NON-BLACK LEVEL PIXELS
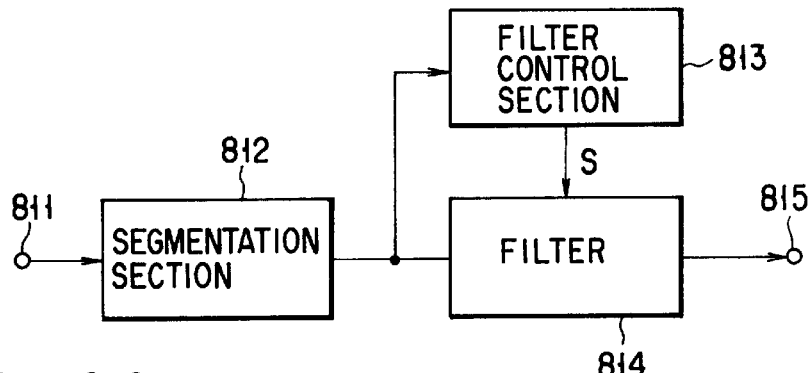
F I G. 22
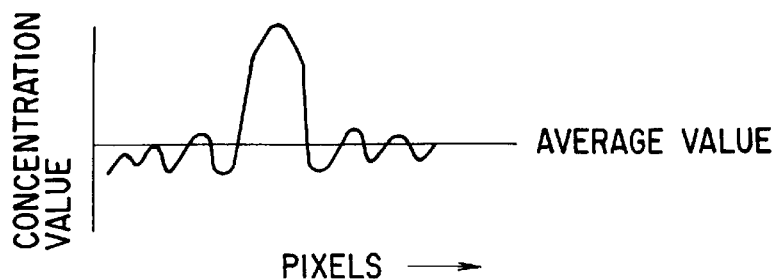
F I G. 25

IMAGE PROCESSING APPARATUS

BACKGROUND OF THE INVENTION

1. Field of the Invention

This invention relates to an image processing apparatus, and more particularly to an image processing apparatus suitable for reducing block distortions occurring in the decoded image in an image encoding/decoding system that compression-codes images into a small amount of data and reproduces the images by decoding the code string obtained through compression coding.

2. Description of the Related Art

Various schemes, including motion compensation, discrete cosine transform, subband coding, and pyramid coding schemes, and combinations of these schemes have been developed as the techniques for compression-coding images into a small amount of data for transmission or storage in the field of systems that transmit and store images, including videophones, teleconference systems, personal digital assistants, digital video disk systems, and digital TV broadcasting systems. ISO MPEG1, MPEG2, ITU-T H. 261 and H. 262 have been prescribed as the international standard schemes for motion-picture compression coding. Each of these schemes is a compression coding scheme that is a combination of motion compensation adaptive prediction and discrete cosine transform. The details of these have been given in, for example, reference 1 (Hiroshi Yasuda, "The Standards for Multimedia Coding", Maruzen, June, 1991).

With a conventional motion picture coding apparatus using motion compensation adaptive prediction and discrete cosine transform, the input picture signal is divided into a plurality of blocks and then each block undergoes motion compensation adaptive prediction. Specifically, the motion vector between the input picture signal and the reference picture signal of the preceding frame is sensed and a prediction signal is created by performing motion compensation on the reference picture signal using the motion vector. In this case, the prediction mode for the more suitable one of the motion compensation prediction signal and intra-frame encoding (prediction signal=0) in which the input picture signal is used directly in coding is selected and a prediction signal for the prediction mode is produced.

Next, the prediction signal is subtracted from the input picture signal to produce a prediction error signal. The prediction error signal undergoes discrete cosine transform (DCT) in blocks of a specific size. The DCT coefficients obtained from the discrete cosine transform are quantized. The quantized DCT coefficients are subjected to variable-length coding and then are multiplexed with coded motion vector information and thereafter the resulting signal is outputted as a code string. On the other hand, the code string is dequantized and then is subjected to inverse discrete cosine transform. The prediction error signal restored by inverse discrete cosine transform is added to the adaptive prediction signal to produce a local decoded signal. The local decoded signal is stored in a frame memory as a reference picture signal.

The code string that has been transferred from the motion picture encoding apparatus and has been stored is inputted to the motion picture decoding apparatus, which then separates the code string into the quantized DCT coefficients and the motion vector information. The quantized DCT coefficients are subjected to variable-length decoding, dequantization, and inverse discrete cosine transform and is thereby reconstructed into a prediction error signal. The motion vector information undergoes variable-length decoding and thereafter a motion compensation prediction process. In the motion compensation prediction process, motion compensation is performed on the reference picture signal of the preceding frame stored in the frame memory to produce a prediction signal. Then, the prediction signal is added to the prediction error signal. This addition produces a picture signal. The reproduced picture signal is outputted outside the decoding apparatus and is also stored in the frame memory as a reference picture signal.

The aforementioned conventional motion-picture encoding/decoding apparatus has the following problems.

Since block coding using orthogonal transform, such as discrete cosine transform, carries out orthogonal transform block by block, it is difficult to sense changes in the signal between blocks. In addition, when coding is done at a low bit rate, the quantization width of the quantizer that quantizes the DCT coefficients (orthogonal transform coefficients) must be made large, making the alternating-current components (high frequency components) more liable to be lost. As a result, smooth changes at the boundary between blocks cannot be represented and the boundary between blocks appears noticeably on the screen in the form of lattice block distortion.

An alternating-current (AC) component prediction scheme using average value has been proposed as a method of predicting the AC components lost in quantization (reference 2: Watanabe and Ohzeki, "Evaluation of an Alternating-Current Component Prediction Scheme Using Average Value," the 1989 picture coding symposium (PCSJ89), 2-2, 1989). Additionally, several other AC prediction schemes have been proposed.

The conventional AC component prediction schemes, however, were based on the assumption that the AC component prediction process is carried out before discrete cosine transform in the coding process. The prediction schemes were not used for removal of block distortions occurred in the decoded pictures. Even if the conventional AC prediction schemes were applied directly to the decoded pictures, the predictable AC components would be limited to only the low-frequency AC components close to a direct current (DC) and the high-frequency AC components in the decoded pictures would be removed.

A method of reducing block distortions has been proposed (reference 3: Izawa, Watanabe, and Takizawa, "Band Preserving Block Distortion Removing Filter in Picture Coding," the 1989 picture coding symposium (PCSJ89), 4-4, 1989). This method is such that the decoded picture obtained by decoding the code string subjected to discrete cosine transform and quantization in blocks of n×n pixels is forced to undergo discrete cosine transform again in large blocks of 2n×2n and the resulting DCT coefficient string is decoded, with the band being limited to almost the same coefficients as the DCT coefficients transferred during coding. This makes it possible to estimate changes in the boundary between blocks, alleviating block distortions. This method, however, requires discrete cosine transform in blocks, each twice as large as the original one in length and breadth, on the decoding side and the encoding side, which makes the decoding process more complex.

Furthermore, quantization causes quantization distortion called mosquito noise around the edge portion, degrading the picture quality. The distortion has particularly a great effect on a flat domain adjacent to the edge portion. A nonrecursive 5×5 adaptive smoothing filter has been proposed as a method of reducing the distortion (reference 4: Kato and Ohkubo, "Improvement of High-Efficiency Coding Picture Quality by Post Filtering", Proceedings 1989 Electric Information Communications Society Autumn National Meeting, Vol. 6, D-3, D-63). Since the method eliminates the high-frequency AC components by applying the filter to the entire screen, the edge portion is blurred a little.

As described above, the conventional motion-picture encoding/decoding apparatus has the problem that block distortions occur at the boundary between blocks as a result of carrying out the processing block by block and lattice distortions appear conspicuously. The conventional method of reducing the distortions is complex in processing. Furthermore, because the method of simply predicting the lost AC components removes the AC components from the blocks originally having the high-frequency AC components, it has an adverse effect on the picture quality.

SUMMARY OF THE INVENTION

An object of the present invention is to provide an image processing apparatus which not only compensates for the lost AC components without the adverse effects of AC components prediction by applying AC component prediction only to the domain where the AC components have been lost, but also requires no complex process like a conventional block distortion reducing method.

Another object of the present invention is to provide an image processing apparatus capable of effectively reducing encoding distortions in the decoded picture signal, and noises and flicker before the coding of the picture signal.

Still another object of the present invention is to provide an apparatus for and method of processing images which examine the local characteristics of the images whose picture quality has deteriorated as a result of coding and control the intensity of smoothing of the filter so that degradation of the picture quality may be inconspicuous, thereby improving the picture quality.

According to the present invention, there is provided an image processing apparatus that not only judges whether or not the region is a flat domain for each specific region of an input picture signal, but also predicts the AC components from the input picture signal, allocates the signals containing the predicted AC components to the regions judged to be flat domains and the input picture signal to the other regions.

The judgment whether or not each domain of the input picture signal is a flat domain is such that, for example, the nature of the picture of the input picture signal is judged domain by domain and the domains where the AC components are equal to or less than a specific value are judged to be flat domains and the other domains are judged to be nonflat domains. For the domains judged to be flat domains, the AC components of the domains are predicted from the picture signals of the surrounding domains and the resulting signals are outputted.

This makes it possible to apply AC component prediction to only the regions from which the AC components have been lost. Therefore, a better picture-quality picture signal with fewer block distortions is obtained without the disadvantage that AC components are removed from the domains that originally contain the high-frequency AC components. Unlike the conventional block distortions reducing scheme, the apparatus does not use a particularly large block as a processing unit, so the processing is simple.

According to the present invention, there is provided an image processing apparatus that not only judges whether the domain is an edge, a flat domain, or a nonflat domain for the input picture signal, replaces the domains of the input picture signal judged to be edges and nonflat domains with the picture signals of the regions judged to be flat domains, and allocates the input picture signal to the other domains, but also predicts the AC components for each domain of the outputted picture signal and outputs the signals containing the predicted AC components for the domains judged to be flat domains and the input picture signal for the other domains.

On the other hand, the domains judged to be nonflat domains may include flat domains in part. Therefore, the nonflat domains adjacent to the flat domains are judged to be edge portions. The flat domains are also subjected to AC component prediction.

This enables AC component prediction to be applied to all of the flat domains, which causes block distortions to be removed without the disadvantage that AC components are removed from the domains that originally contain the high-frequency AC components. At the edge portions, the input picture signal is replaced with the picture signal of the flat domains free from mosquito noise around the edge portions and is then subjected to AC component prediction, thereby producing a good picture signal for which mosquito noise has been suppressed.

According to the present invention, there is provided a video signal processing apparatus comprising time filter means that performs a filtering process on an input picture signal with respect to time according to a specific filter coefficient and outputs an output picture signal, and filter coefficient decision means that determines a filter coefficient in the time filter means according to at least the amount of the difference between the input picture signal and the signal obtained by delaying the output video signal or between the input picture signal and the signal obtained by delaying the input picture signal.

When the video signal processing apparatus receives as an input picture signal the picture signal decoded by the video decoding apparatus from the encoded data obtained at the video encoding apparatus having a plurality of encoding modes, the filter coefficient decision means determines a filter coefficient in the time filter means according to at least (a) the amount of the difference between the input picture signal and the signal obtained by delaying the output picture signal or between the input picture signal and the signal obtained by delaying the input picture signal and (b) the encoding mode of the video encoding apparatus.

With the picture signal processing apparatus, encoding distortions, which are particularly conspicuous in the still portions, are effectively alleviated by determining the filter coefficient so that the signal subjected to relatively intense time filtering may be outputted as an output picture signal in the portions where the amount of the difference between the input picture signal and the signal obtained by delaying the output picture signal or between the input picture signal and the signal obtained by delaying the input picture signal is small, that is, the still portions. Furthermore, even when the picture changes significantly as a result of the changing of the scene, the large change in the picture is prevented from being left in the form of an afterimage by determining the filter coefficient so that the decoded picture signal may be outputted as it is or the decoded picture signal subjected to less intense time filtering may be outputted as an output picture signal.

When the filter coefficient is determined, taking the encoding mode into account, the unnaturalness of the decoded picture resulting from the difference in encoding method between the encoding mode (intra-frame encoding mode) of the portions for which refresh encoding has been done and the encoding mode (motion compensation prediction encoding mode) of the other portions, is overcome by, for example, setting a filter coefficient so that the portion for which refresh encoding has been done may be subjected to relatively intense time filtering.

Still furthermore, the filter coefficient may be determined, taking into account activity, or an evaluation value indicating the complexity of a picture. In this case, for example, the blurring of the picture caused by time filtering is made less by applying less intense time filtering to the edges with high activity or to the portions containing fine patterns or by outputting the input picture signal as it is. In addition, encoding distortions are effectively suppressed by applying intense time filtering to the flat domains where the activity is low and encoding distortions tend to be conspicuous.

Furthermore, with the present invention, the time filtering process and the determination of a filter coefficient may be carried out after the low-level pixel removing process. The low-level pixel removing process is such that the pixel signals of low-level pixels which exist at the edge of the picture and whose pixel values are equal to or smaller than a threshold value are removed from the input picture signal.

This improves the encoding efficiency by removing the pixel signals of low-level pixels, such as black-level pixels existing at the edge of the picture caused by a camera input problem or the like, from the input picture signal before compression coding, resulting in an improvement in the quality of encoding.

With the present invention, the low-level pixel removing process that the pixel signals of low-level pixels which exist at the edge of the picture and whose pixel values are equal to or smaller than the threshold value are removed from the input picture signal is realized by sensing the low-level pixels whose pixel values are equal to or smaller than the threshold value from the input picture signal, finding how many low-level pixels are at the edge of the picture, and replacing the pixel values of the low-level pixels with the pixel values of the pixels other than the low-level pixels determined on the basis of the found number of low-level pixels.

According to the present invention, there is provided an image processing apparatus comprising a segmenting circuit that, when the compression-coded picture signal is decompressed to restore the original picture signal, determines the restored picture signal to be an input picture signal and segments the input picture signal into a plurality of blocks, a filter control circuit that makes smoothing more intense as the difference between the maximum and minimum of the pixel values in the picture blocks segmented by the segmenting circuit is larger and also makes smoothing more intense when the difference between the maximum value and minimum value is smaller than a setting value, and a filter that changes the intensity of smoothing by the signal from the filter control circuit and filters the input picture signal.

Furthermore, according to the present invention, there is provided a video signal processing apparatus comprising a segmenting circuit for segmenting an input picture signal into a plurality of blocks, a filter control circuit that counts the number of zero-crossings, with the average value in the blocks segmented by the segmenting circuit being set at zero, or the number of maximal values or minimal values, and generates a signal that makes smoothing less intense as the number of maximal values or minimal values is larger, and a filter that changes the intensity of smoothing by the signal from the filter control circuit and filters the input picture signal.

With the present invention, by examining the local nature of the picture and controlling the intensity of smoothing of the filter according to the local nature, the deterioration of picture quality is made less conspicuous.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of an image processing apparatus according to a first embodiment of the present invention;

FIG. 2 illustrates the image processing carried out by the image processing apparatus of the first embodiment;

FIG. 3 shows the relationship between the distance and blocks in an AC component prediction scheme;

FIG. 4 illustrates the adverse effects of AC component prediction at the edge portion;

FIG. 5 is a block diagram of an image processing apparatus according to a second embodiment of the present invention;

FIG. 9 is a block diagram of a network system to which an image processing apparatus of the present invention is applied;

FIG. 10 is a schematic block diagram of a video encoding apparatus and a video decoding apparatus used in the network system of FIG. 9;

FIG. 21 is a drawing to help explain the operation of the image processing apparatus of the eighth embodiment;

FIG. 22 is a schematic block diagram of the basic configuration of an image processing apparatus according to a ninth embodiment of the present invention;

FIG. 25 is a waveform diagram of the signal obtained from the filtering process.

DETAILED DESCRIPTION OF THE PREFERRED EMBODIMENTS

Figure 6:
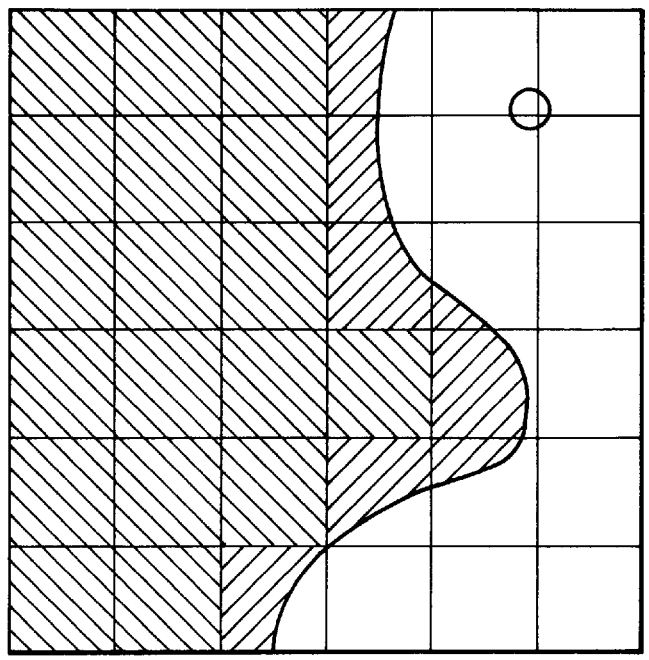
FIG. 6 illustrates blocks that are liable to produce mosquito noise.

An image processing apparatus according to a first embodiment of the present invention will be explained by reference to FIG. 1. In the figure, the inputted code string 131 is a code string obtained at a video encoding apparatus and is decoded by a decoder 101 to reproduce a decoded picture signal 131. The decoded picture signal 132 is inputted to a flat domain decision unit 129 and an AC (AC) component predictor 104.

The decoded picture signal 132 inputted to the flat domain decision unit 129 is first divided by a segmentation unit 102 into a plurality of small blocks. A picture quality decision unit 103 determines the magnitude of the AC components lost in quantizing the DCT coefficients at the video encoding apparatus. As an example, it is assumed that an 8×8 block is used as a small block and the activity (dispersion) Act found using the following equation is used as the value representing the magnitude of the AC components:

$$Act = \sum_{i=1}^{N} \left| ai - \sum_{i=1}^{N} \frac{aj}{N} \right|$$

where ai indicates the pixel value of each pixel in a block and N indicates the number of pixels in a block. The activity Act determined from the equation represents the dispersion within the block. The smaller the value, the more direct-current components the block contains, which means that the block contains fewer AC components.

The flat domain decision unit 129 judges that of the small regions (blocks) divided at the segmentation unit 102, the blocks with the value of activity Act smaller than a specific value are flat domains and the other blocks are nonflat domains, and then outputs a decision signal 134.

On the other hand, the decoded picture signal 132 inputted to the AC component predictor 104 undergoes the prediction of AC components in the procedure described below to produce an AC component prediction picture signal 133. A switch 105 is controlled by the decision signal 134 from the flat domain decision unit 129. The switch switches the output signal to the AC component prediction picture signal 133 outputted from the AC component predictor 104 in the case of the blocks determined by the flat domain decision unit 129 to be flat domains, or the blocks for which the picture quality decision unit 103 has determined that the blocks contain fewer AC components. In the case of the other blocks, the switch outputs the decoded picture signal 132 as it is.

In this way, only for the blocks of flat domains with fewer AC components, the decoded picture signal 135 replaced by the AC component prediction picture signal 134 is outputted from the switch unit 105. FIG. 2 illustrates the situation where the flat-domain blocks are converted into AC prediction blocks, or blocks composed of the AC component prediction picture signals 133.

Next, a method of realizing the AC component predictor 104 will be described. Various AC component prediction schemes have been proposed as described earlier. Here, the AC component prediction scheme described in reference 2 is taken as example. The algorithm of the AC component prediction scheme will be explained briefly.

[Step 1] Set n=8

[Step 2] Find the direct-current (DC) component for each of the blocks of n×n pixels

[Step 3] Divide each block into four sub-blocks of (n/2)× (n/2) pixels

[Step 4] Find the DC component of each sub-block by weighting the DC components of the blocks around the sub-block, taking the distance into account as shown in the following equation (see FIG. 3):

$$C_2 = \frac{W(d1) \times A + W(d2) \times B + W(d3) \times C + W(d4) \times D}{W(d1) + W(d2) + W(d3) + W(d4)}$$

where A, B, C, and D indicate the DC components (the average values) of the respective blocks and C2 indicates the DC component of a sub-block. W(di), (i=1, 2, 3, 4) is a function that represents weighting according to the distance between the sub-block whose DC component is C2 and each of the respective blocks whose DC components are A, B, C, D. Here, it is assumed that the values shown in the following equation are used:

$$W(d1):W(d2):W(d3):W(d4)=3:\sqrt{5}:3\sqrt{5}:3$$

[Step 5] Set n =n/2. In this case, if n=1, the operation is terminated; otherwise, control returns to step 2.

The AC component is obtained using the DC component obtained according to the above steps. In other words, the average of the pixel values of each block is a DC component. The component except for the DC component becomes an AC component.

In the AC component prediction, the value of each pixel is calculated using the value of the DC component of each block (8×8 pixels). In other words, the pixel value is obtained by prediction, and the signal except for the DC component of the block (8×8 pixels) is reproduced as the AC component signal.

The AC component predictor 104 performs AC prediction according to the above-described algorithm.

When the AC component predictor 104 makes prediction between blocks crossing an edge, the outside of the edge has an effect on the noticed sub-block, making the edge blunt. As a result, there may a case where AC components differing from the components contained in the original picture signal are produced. To prevent such AC components from being produced, weighting is forced to be zero for the blocks having the DC components that differ from the DC components contained in the noticed block by a specific value or more.

Next, FIG. 5 is a block diagram of the configuration of an image processing apparatus using an edge decision AC component prediction scheme according to a second embodiment of the present invention. The purpose of the second embodiment is to simultaneously remove not only block distortions but also mosquito noise appearing noticeably particularly near the edge of the image shown by dark dots in FIG. 6.

In FIG. 5, the inputted code string 231 is a code string obtained at a video encoding apparatus and is decoded by a decoder 201 to reproduce a decoded picture signal 232. The decoded picture signal 232 is inputted to an edge/flat domain decision unit 209 and a displacement unit 211.

The decoded picture signal 232 inputted to the edge/flat domain decision unit 209 is first divided by a segmentation unit 202 into a plurality of small blocks. An image quality decision unit 203 classifies these small blocks into flat domains and nonflat domains. Then, an edge block decision unit 206 decides that the nonflat domains adjacent to the domains determined to be flat domains at the picture quality decision unit 203 are blocks (edge blocks) containing the edges. The picture quality decision unit 203 outputs a flat domain decision signal 237. The processing algorithm of the picture quality decision unit 203 and edge block decision unit 206 is shown below.

[Step 1] Find the activity of each block.

[Step 2] Classify the individual blocks into flat domains and nonflat domains according to the values of the blocks.

Figure 7:
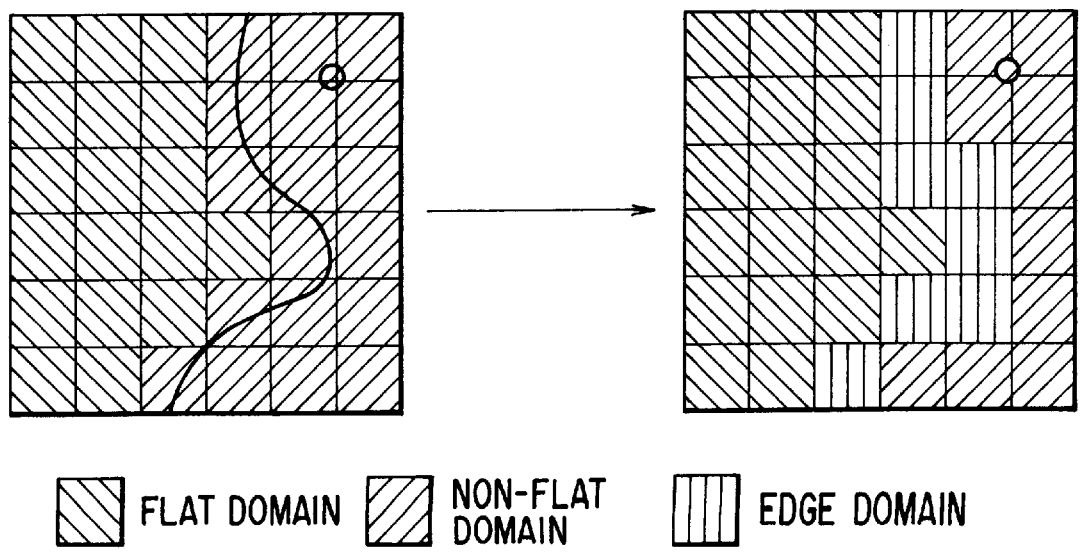
FIG. 7 illustrates the image processing carried out by the image processing apparatus of the second embodiment.

[Step 3] Determined the nonflat domains adjacent to flat domains to be edge portions (edge blocks). FIG. 7 shows this situation. In this example, the blocks containing the edges forming the outline of the picture on the left of the figure are nonflat domains adjacent to flat domains, so the blocks are determined to be edge blocks.

Next, an edge decision unit 207 separates the blocks determined by the edge block decision unit 206 to be edge blocks into the domains continuing from the flat domains adjacent to the edge blocks and the other domains. To simply explanation, it is assumed that the pixels having a luminance in the range of a specific value from the DC components of the luminance of the flat domains adjacent to the edge blocks are determined to be the domains continuous with the flat domains and are separated from the remaining domains. As a result of the judgment, the edge decision unit 207 outputs edge decision signals 236 and 238.

On the other hand, in the displacement unit 211, for the inputted decoded picture signal 232, an edge portion displacement unit 208 takes the average of the pixel values in the domains determined to be domains continuous with the flat domain blocks among the blocks decided by the edge decision unit 207 to be edge portions, for each of the blocks divided by the segmentation unit 210, on the basis of the edge decision signal 236 from the edge decision unit 207. The edge portion displacement unit uses the average value as the representative average value (DC component) for all of the edge blocks, which is substituted for the decoded picture signal 232 of the block. Then, as with the first embodiment, the AC component predictor 204 performs AC component prediction on the picture signal 239 whose edge blocks have been replaced by the edge portion displacement unit 208, thereby producing an AC component prediction picture signal 233.

Finally, a switch 205 substitutes the AC component prediction picture signal 233 from the AC component predictor 208 for the blocks determined by the picture quality decision unit 203 to be flat domains and the blocks determined by the edge decision unit 207 to be edge blocks, on the basis of the flat domain decision signal 237 from the picture quality decision unit 203 and the edge decision signal 238 from the edge decision unit 207. The switch then outputs the resulting signal. For the remaining regions, the switch outputs the decoded picture signal 232 as it is.

A series of operations described above will be explained by reference to FIG. 8. The edge decision unit 207 separates edge block (shown at (b) in FIG. 8) in picture (shown at (a) in FIG. 8) into a first region in the upper part and a second region in the lower part. Next, the edge displacement unit 208 substitutes the average of the pixel values in the first region for the entire edge block (shown at (b) in FIG. 8) as shown by region (shown at (d) in FIG. 8). Then, the AC component predictor 204 performs AC component prediction as shown by region (shown at (e) in FIG. 8). Then, the signal whose AC components have been predicted in region (shown at (e) in FIG. 8) is combined with the signal in the nonflat domain discontinuous with the adjacent flat domain in the lower part of region (shown at (c) in FIG. 8), as shown by region (shown at (f) in FIG. 8), thereby preserving information on the edge portion.

Figure 8:
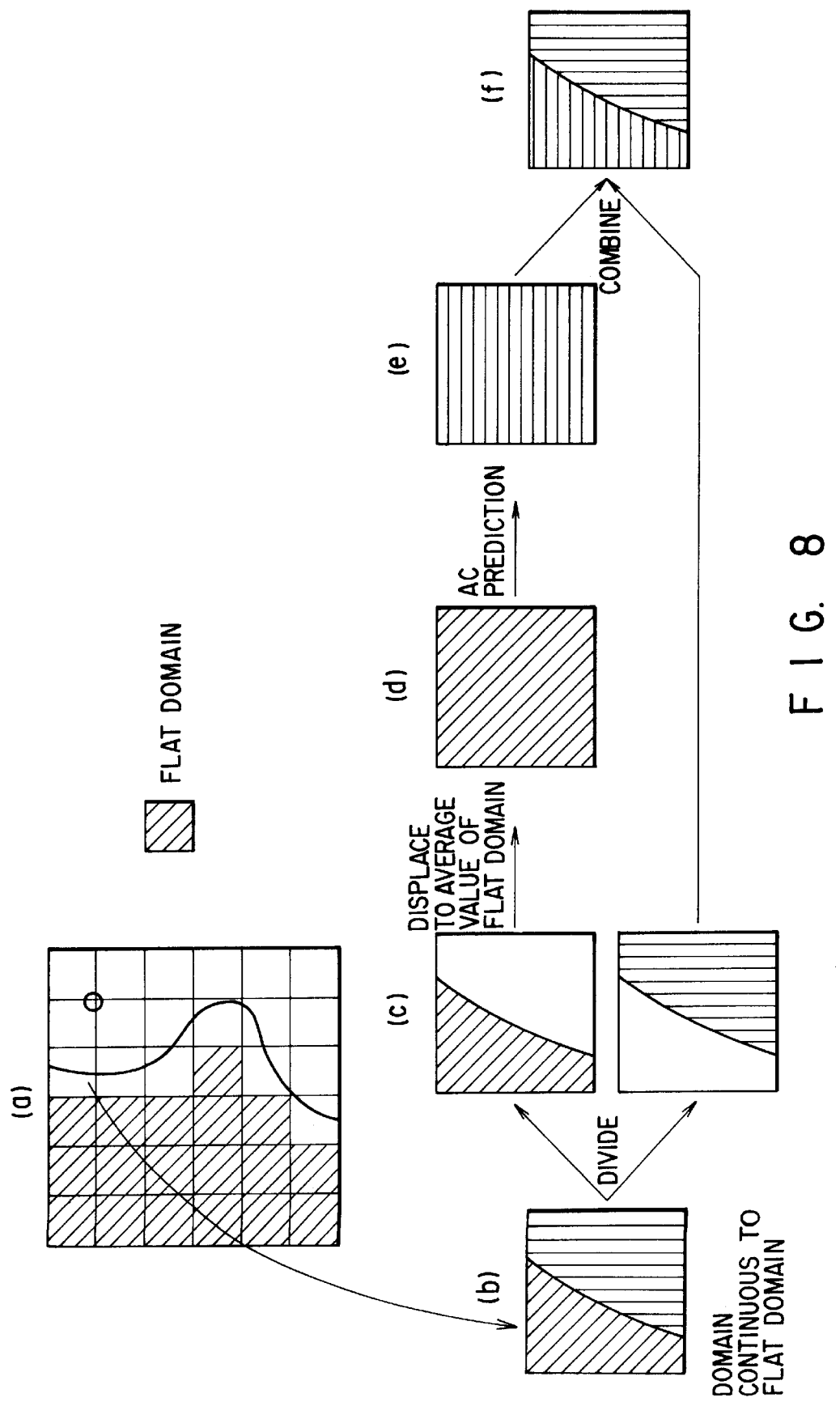
FIG. 8 illustrates the image processing at block level carried out by the image processing apparatus of the second embodiment.

In this case, after the processing at the regions (shown at (c) to (e) in FIG. 8) has set the vicinity of the edge portion at a uniform pixel value, AC component prediction is made, which suppresses mosquito noise produced at the edge portion.

While in the embodiment, the activity (dispersion) of the image is used as an index for judging whether a region is a flat domain or a nonflat domain, the present invention is not restricted to this. Various decision methods may be used. According to each of the various decision methods, the flat domain decision unit 129 may be constructed suitably.

In the above embodiment, the edge deciding method is such that the pixel value (luminance) of the picture signal is simply examined and a portion differing from the adjacent pixel by a specific value or more is decided to be an edge portion. Other various edge deciding methods may be used. By using each of the various edge deciding methods, the edge/flat domain decision unit 209 may be constructed suitably.

While in the embodiment, the displacement unit 211 is composed of the segmentation unit 210 and edge portion displacement unit 208 according to the AC component prediction scheme, this configuration is not necessarily followed. If division into small domains is not necessary, a method of replacing the nonflat domains with the signals in the flat domains on the entire screen, instead of replacement on a small domain basis, may be used.

As an application of the present invention, an embodiment of a motion-picture transmission system to which a video encoding/decoding apparatus has been applied will be described by reference to FIG. 9. The picture signal inputted from a camera 302 provided on a personal computer (PC) 301 is coded by a video encoding apparatus built in the PC 301. The coded data outputted from the video encoding apparatus is multiplexed with other audio information and data and then is transmitted by a radio transceiver 303 and is received by another radio transceiver 304. The signal received by the radio transceiver 304 is separated into the coded data of the picture signal and the audio signal and data. Of these, the coded data of the picture signal is decoded by the video decoding apparatus built in a workstation (EWS) 305 and the decoded signal is allowed to appear on the display of the EWS 305.

On the other hand, the picture signal inputted from a camera 306 provided on the EWS 305 is coded by a video encoding apparatus built in the EWS 305 as described above. The coded data of the picture signal is multiplexed with other audio signal and data and then is transmitted by the radio transceiver 304 and is received by the radio transceiver 303. The signal received by the radio transceiver 303 is separated into the coded data of the picture signal and the audio signal and data. Of these, the coded data of the picture signal is decoded by the video decoding apparatus built in the PC 301 and the decoded signal is allowed to appear on the display of the PC 301.

FIG. 10 is a schematic block diagram of the video encoding apparatus and video decoding apparatus built in the PC 301 and EWS 305, respectively.

The video encoding apparatus of FIG. 10 comprises a data source encoding section 312 that includes an error resilience processor 313 and receives the picture signal from a video input section 311, such as a camera, and a transmission line encoding section 314. The data source encoding section 312 provides discrete cosine transform (DCT) of the prediction error signal and quantizes the produced DCT coefficients. The transmission line encoding section 314 performs variable-length coding, senses errors in the coded data, and produces error-correcting code. The coded data outputted from the transmission line encoding section 314 is transmitted to a radio transceiver 315, which transmits it.

On the other hand, the video decoding apparatus of FIG. 10 comprises a transmission line decoding section 312 that receives the coded data received by a radio transceiver 321 and carries out the opposite process to that of the transmission line encoding section 314 and a data source decoding section 323 that includes an error resilience processor 324 for carrying out the opposite process to that of the data source encoding section 312 and receives the output signal of the transmission line decoding section 321. The picture decoded by the data source decoding section 323 is outputted by a video output section 325, such as a display.

With the image processing apparatus of the embodiment, visual high-quality decoded pictures can be obtained by reducing block distortions in the decoded picture signal caused in coding the picture signal and distortions, such as mosquito noise, caused during quantization.

Furthermore, with the embodiment of the invention, because AC component prediction is performed only on flat blocks having fewer block distortions and high-frequency components for which mosquito noise is conspicuous, this solves the problem that processing is performed on regions including edges or complex pictures and consequently the picture is blurred. Unlike the conventional block distortion reducing method, the embodiment need not perform processing on large blocks, so the processing is simple.

Figure 11:
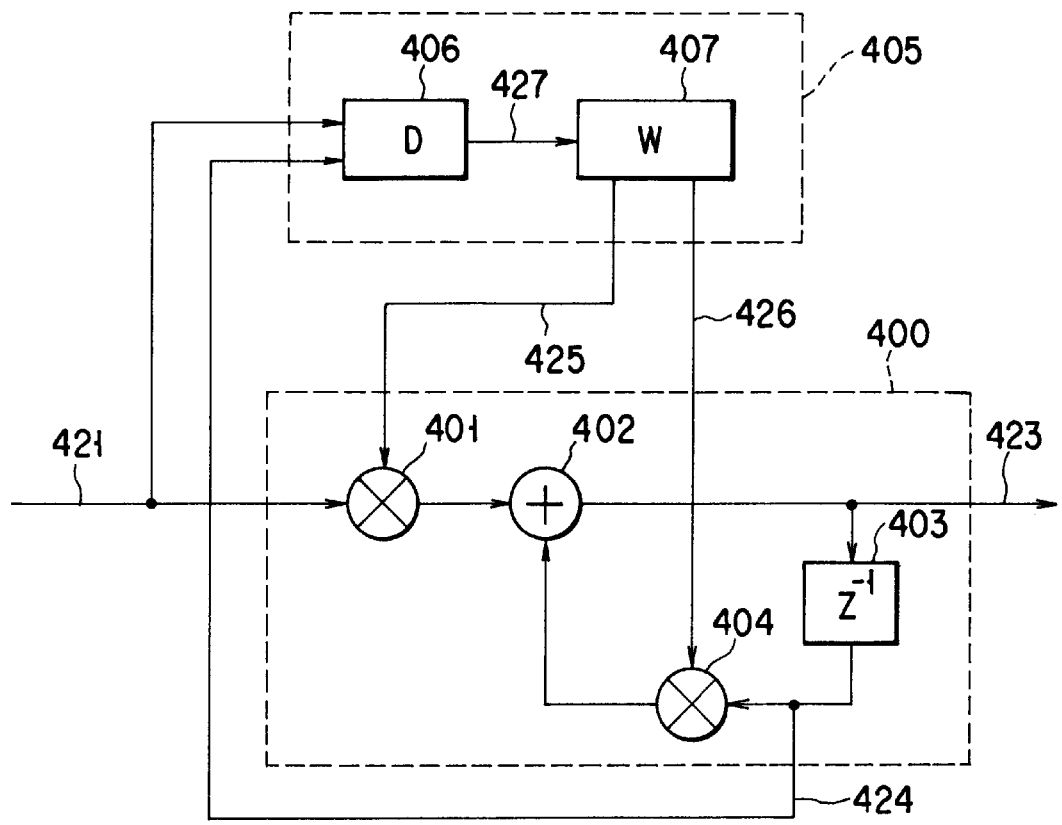
FIG. 11 is a block diagram of an image processing apparatus according to a third embodiment of the present invention.

FIG. 11 shows the configuration of an encoding distortion reducer in an image processing apparatus according to a third embodiment of the present invention. The encoding distortion reducer receives the decoded picture signal 421 as an input picture signal from the video decoding apparatus and causes a time-domain adaptive filter 400 to perform a filtering process (hereinafter, referred to as a time filtering process) on the decoded picture signal 421 within time-domain, and outputs an output picture signal 423.

The time-domain filter 400 is composed of a first multiplier 401, an adder 402, a frame delay circuit 403, and a second multiplier 404. The filter coefficient (hereinafter, referred to as the weight coefficient) of the time-domain filter 400 is determined by a weight coefficient decision section 405. The weight coefficient decision section 405 is composed of an inter-frame difference calculator 406 and a weight coefficient calculator 407.

Now, the operation of the encoding distortion reducer of the embodiment will be described.

The inputted decoded picture signal 421 is multiplied at the first multiplier 401 by a first weight coefficient 425 outputted from the weight coefficient decision section 405, and the resulting signal is inputted to the adder 402. The output signal from the adder 402 is outputted as an output picture signal 423 to the outside world and is also inputted to the frame delay circuit 403. The frame delay circuit 403 outputs a signal 424 obtained by delaying the output picture signal 423 for one frame. The output signal 424 from the frame delay circuit 403 is multiplied at the second multiplier 404 by a second weight coefficient 426 outputted from the weight coefficient decision section 405. The output signal from the second multiplier 404 is added to the output signal from the first multiplier 401 at the adder 402.

The weight coefficient decision section 405 determines weight coefficients 425, 426 pixel by pixel as shown below, on the basis of the decoded picture signal 421 and the output picture signal 424 of the previous frame. First, the inter-frame difference calculator 406 computes the amount D of the difference between the decoded picture signal 421 and the output picture signal 424 of the preceding frame according to the following equation using pixels in the range of ±M from the pixels to be processed:

$$D = \frac{1}{S(R)} \sum_{k,l \in R} |f_t(m+k, n+1) - g_{t-1}(m+k, n+1)|$$

where $f_t$ (m, n): the pixel values of the decoded picture signal 421

$g_{t-1}$ (m, n): the pixel values of the output picture signal 424 of the previous frame R: D's calculation range (−M<k, 1<M)

S(R): the number of pixels contained in R

From the amount D of the difference thus calculated, the weight coefficient calculator 407 calculates and determines a weight coefficient.

Figure 12:
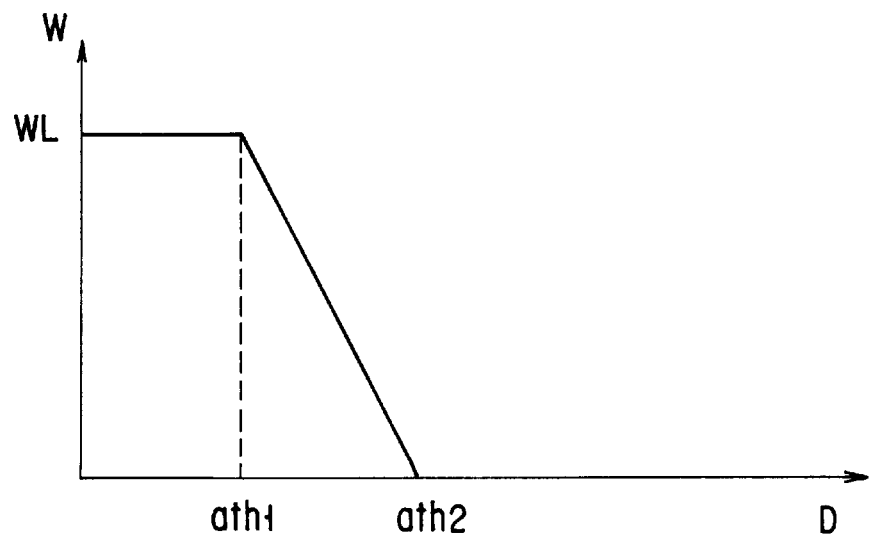
FIG. 12 shows the relationship between the inter-frame difference and the weight coefficient in the third embodiment.

FIG. 12 shows an example of the relationship between the amount D of the difference and the weight coefficient. In the figure, W on the vertical axis indicates the second weight coefficient 426. The first weight coefficient 425 is determined to be (1−W). In addition, ath1, ath2, and WL are predetermined constants.

As described above, the weight coefficient decision section 405 determines the weight coefficients adaptively according to the amount D of the difference between the decoded picture signal 421 and the output picture signal 424 of the previous frame. That is, when the amount D of the difference is small, the weight coefficient decision section makes a determination so that W may be large. This prevents the decoded picture signal 421 added with encoding distortions from being outputted directly for the still portions where encoding distortions tend to be conspicuous. Instead, the time-domain filter 400 performs a time filtering process on the decoded picture signal 421 through weighting addition with the output picture signal 424 of the previous frame. The resulting signal is then outputted as the output picture signal 424, thereby alleviating encoding distortions.

On the other hand, in a place where the amount D of the difference is equal to or larger than the threshold value ath2, W=0 holds, and the decoded picture signal 421 is outputted directly as the output picture signal 423. This prevents a large change in the picture from remaining in the form of an afterimage, even in a place where the picture changes greatly from the previous frame as a result of, for example, the changing of the scene.

While in the embodiment, the processing is carried out in pixels, the processing may be performed in blocks.

Figure 13:
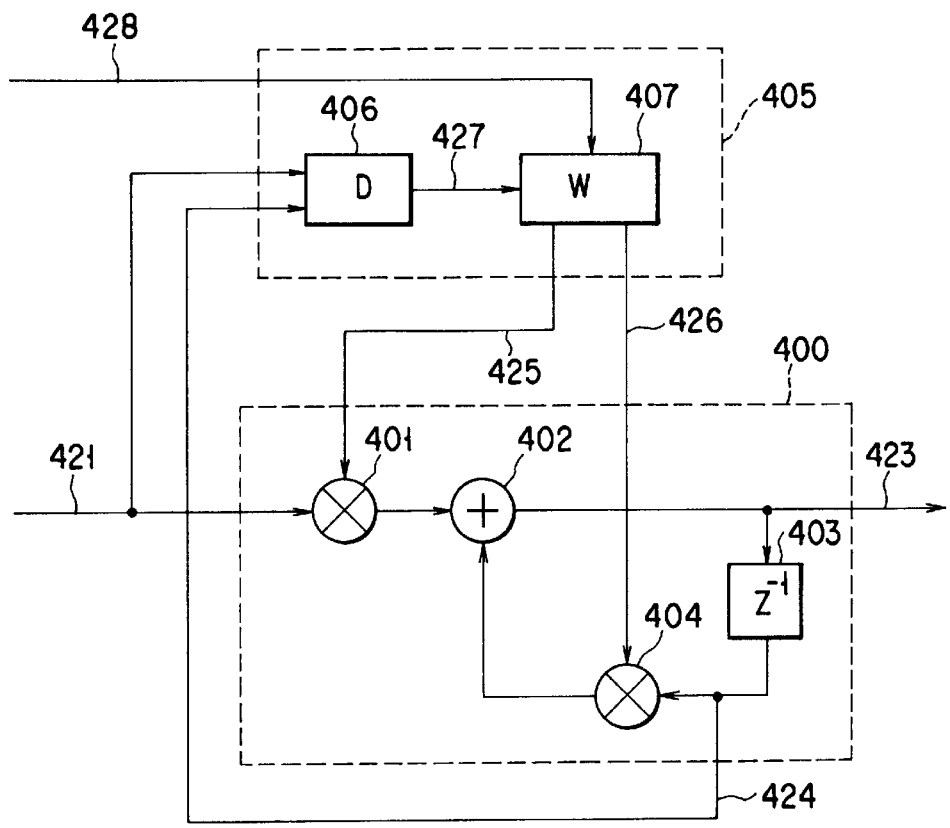
FIG. 13 is a block diagram of an image processing apparatus according to a fourth embodiment of the present invention.

FIG. 13 is a block diagram of an encoding distortion reducer, which is a picture signal processing apparatus according to a fourth embodiment of the present invention. In this embodiment, the relationship between the amount D of the difference and the weight coefficient W is changed according to, for example, the largeness of the motion vector detected by the video encoding apparatus. In the embodiment, a signal (referred to as a side information signal) 428 indicating the encoding mode and motion vector is inputted to the weight coefficient calculator 407 in the filter coefficient decision section 405, in addition to the decoded picture signal 421 from the video decoding apparatus.

Figure 14:
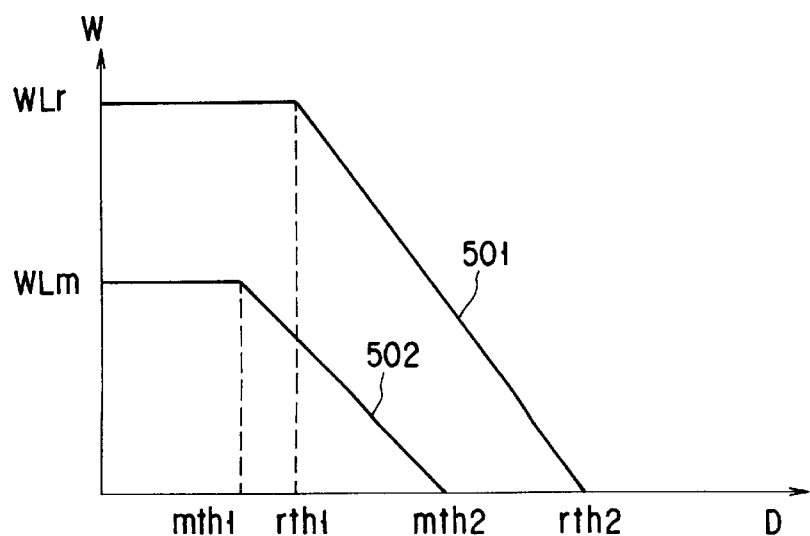
FIG. 14 shows a first example of the relationship between the inter-frame difference and the weight coefficient in the fourth embodiment.

FIG. 14 shows an example of switching the relationship between the amount D of the difference and the weight coefficient W between the portions subjected to refresh coding and the other portions, when the video encoding apparatus performs refresh coding to suppress the propagation of picture quality deterioration caused by errors in the transmission channel. The characteristic indicated by 501 is used for the portions subjected to refresh coding and the characteristic indicated by 502 is used for the other portions.

The reason why in the characteristic 501 that weight coefficient W tends to be large in the portions subjected to refresh coding is that the encoding mode for the portions subjected to refresh coding is the intra-frame encoding mode, so the nature of the decoded picture is different because the encoding method differs from the encoding mode in the other portions (e.g., the motion compensation prediction encoding mode), with the result that the decoded picture tends to be unnatural. In the still portions where encoding distortions tend to be conspicuous or in the portions where motion is small, when the portions which have been in the normal motion compensation prediction encoding mode up to the previous frame have changed the mode to the intra-frame encoding mode or the refresh encoding mode, a change in the nature of the decoded picture gets noticeable visually, making the subjective quality of the decoded picture liable to deteriorate.

In contrast, when the characteristic 501 in FIG. 14 is used, the weight coefficient W, that is, the weight coefficient 426 for the output picture signal 424 of the previous frame, becomes larger in the still portions where the amount D of the difference gets smaller or the portions where motion is small. Therefore, of the decoded video signal 421, the portion where the nature has changed due to refresh coding is subjected to weighting addition with the output picture signal 424 of the previous frame, which thereby performs the time filtering process strongly on that portion, minimizing the deterioration of the picture quality.

Figure 15:
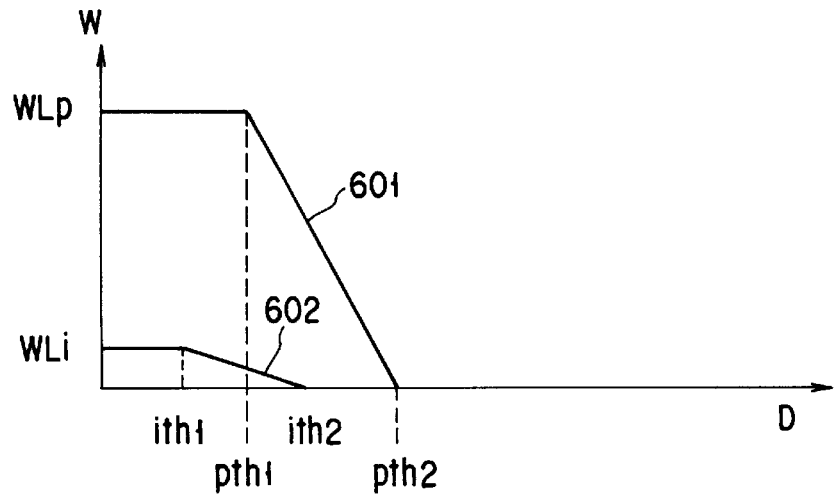
FIG. 15 shows a second example of the relationship between the inter-frame difference and the weight coefficient in the fourth embodiment.

FIG. 15 shows another example of a relationship between the amount D of the difference and the weight coefficient W in the embodiment. In the motion compensation prediction encoding mode, the characteristic 601 that the weight coefficient W becomes larger is used. The use of the characteristic 601 suppresses encoding distortions caused by an erroneous motion vector at the boundary between the still portion and the moving object. This helps reduce encoding distortions especially in patch motion compensation that is liable to cause large distortions at the boundary of the object.

On the other hand, in the intra-frame encoding mode, such distortions do not occur, so the characteristic 602 that the weight coefficient W becomes smaller is used.

Figure 16:
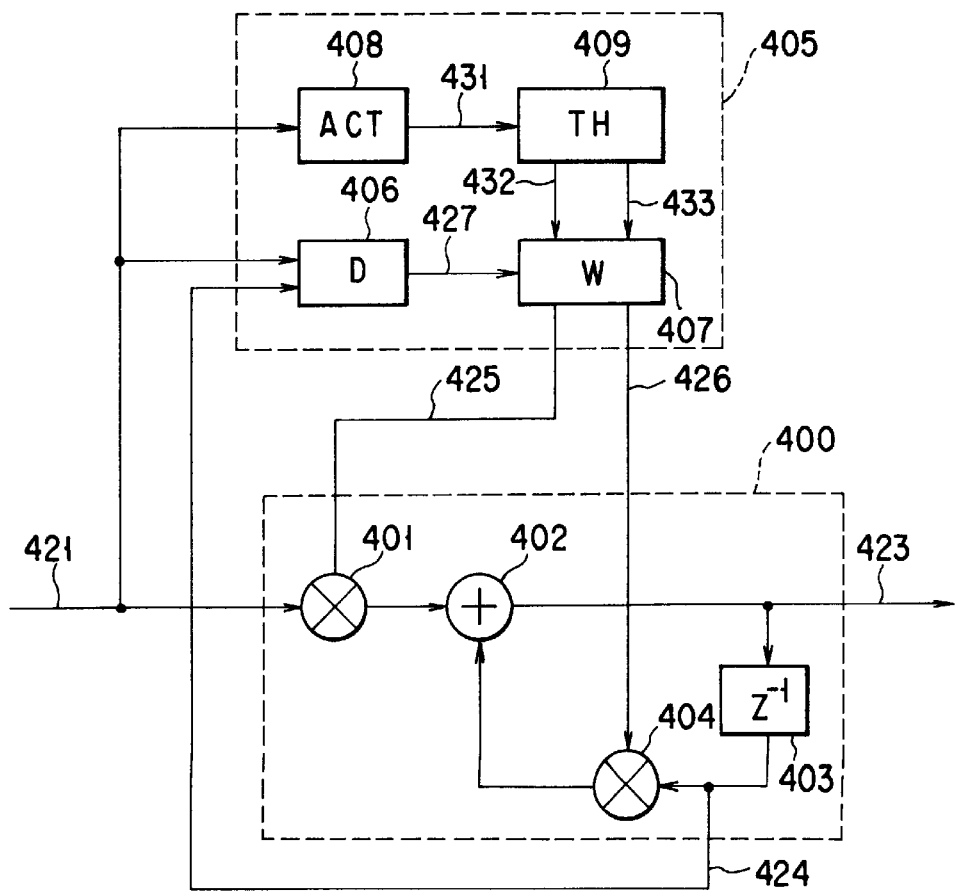
FIG. 16 is a block diagram of an image processing apparatus according to a fifth embodiment of the present invention.

FIG. 16 is a block diagram of an encoding distortion reducer, which is a picture signal processing apparatus according to a fifth embodiment of the present invention. In this embodiment, the relationship between the amount D of the difference and the weight coefficient W is changed according to the activity representing the complexity of a picture. In the embodiment, a filter coefficient decision section 405 is such that an activity calculator 408 computes the activity of the decoded picture signal 421 and a threshold calculator 409 produces threshold values ath1 and ath2 of FIGS. 17A and 17B so that the threshold values may change according to the calculated activity.

First, the activity calculator 408 and inter-frame difference calculator 406 compute the activity 431 of the decoded picture signal 421 and the amount 427 of the difference between the decoded picture signal and the output picture signal 424 of the previous frame according to the following equation using pixels in the range of ±M from the pixels to be processed:

$$act = \frac{1}{S(R)} \sum_{k,l \in R} \left| f_t(m+k, n+1) - \frac{1}{S(R)} \sum_{k,l \in R} f_t(m+k, n+1) \right|$$

$$D = \frac{1}{S(R)} \sum_{k,l \in R} |f_t(m+k, n+1) - g_{t-1}(m+k, n+1)|$$

where act: activity 431

$f_t$ (m, n): the pixel values of the decoded picture signal 421.

$g_{t-1}$ (m, n): the pixel values of the output picture signal 424 of the previous frame.

R: the calculation range ($-M \leq k, 1 \leq M$) of act and D.

S(R): the number of pixels contained in R.

Figure 17A:
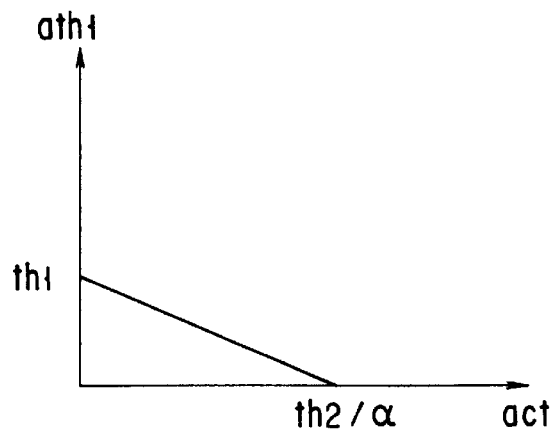
FIGS. 17A and 17B show the relationships between the activity and the threshold value in the fifth embodiment.
Figure 17B:
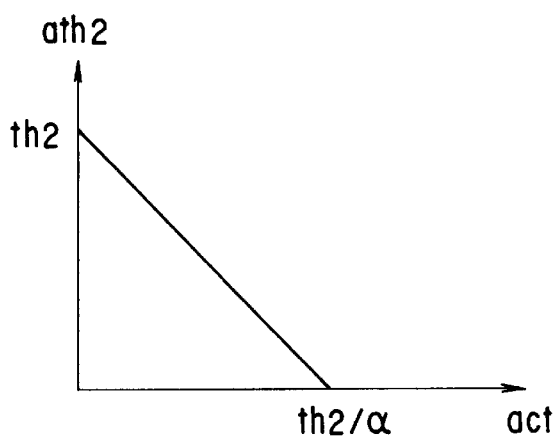

Next, the threshold calculator 409 determines a first threshold 432 (ath1) and a second threshold value 433 (ath2) from the activity 221 on the basis of the characteristics in FIGS. 17A and 17B. In FIGS. 17A and 17B, th1, th2, and α are predetermined constants. The characteristics shown in FIGS. 17A and 17B are expressed by the following equations:

ath1=th1−α·act·th1/th2 ath2=th2−α·act

Then, the weight coefficient calculator 407 determines weight coefficients 425 and 426 according to the characteristic shown in FIG. 12 on the basis of the amount 427 of the difference and the first and second threshold values 432 and 433.

By changing the characteristic of the time-domain filter 400 according to the activity, the threshold values ath1 and ath2 become smaller and the weight coefficient W gets smaller in the portions where the activity is high, that is, at the edges and the portions where the pattern is fine. This reduces the intensity of time filtering at the time-domain filter 400, which helps minimize the blurring of the picture caused by the time filter.

On the other hand, because the flat domains where encoding distortions tend to be conspicuous have a low activity, the weight coefficient W tend to be large, with the result that time filtering is effected strongly, producing a great encoding distortion suppressing effect.

Figure 18:
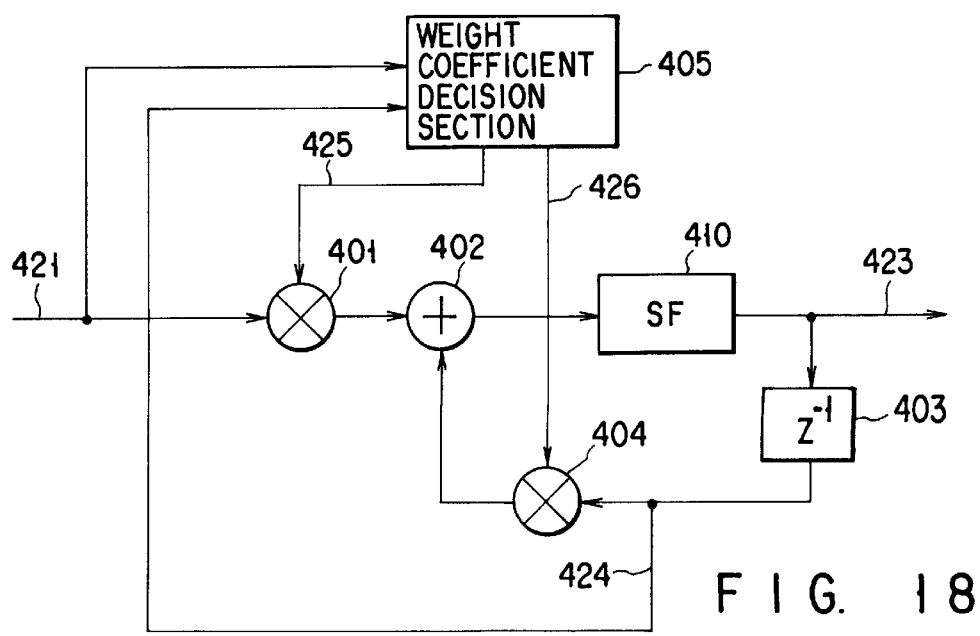
FIG. 18 is a block diagram of an image processing apparatus according to a sixth embodiment of the present invention.

FIG. 18 is a block diagram of an encoding distortion reducer, which is a picture signal processing apparatus according to a sixth embodiment of the present invention. The corresponding parts to those in FIG. 11 are indicated by the same reference symbols. The sixth embodiment differs from the third embodiment in that an additional spatial filter 410 is used and the output signal of the adder 402 undergoes an encoding distortion reducing process with respect to spatial at the spatial filter 410 and thereafter the resulting signal is outputted as an output picture signal 423.

The spatial filter 410 removes encoding distortions by performing the filtering process with respect to spatial domain. Specifically, for example, the spatial filter changes the intensity of filtering adaptively according to the amount of the difference between adjacent pixels in such a manner that it makes the filtering more intense for a smaller difference between pixels and less intense for a larger difference between pixels. This makes it possible to remove encoding distortions, including mosquito distortions, while preserving the edges.

With the present embodiment, by combining the removal of encoding distortions with respect to time by the time-domain filter 400 with the removal of encoding distortion with respect to the spatial filter, an afterimage seldom occurring as a result of the weighting addition of the output picture signal 424 delayed one frame from the decoded picture signal 421 can be removed, improving the quality of the output picture signal 423 as compared with use of the time filter only.

Figure 19:
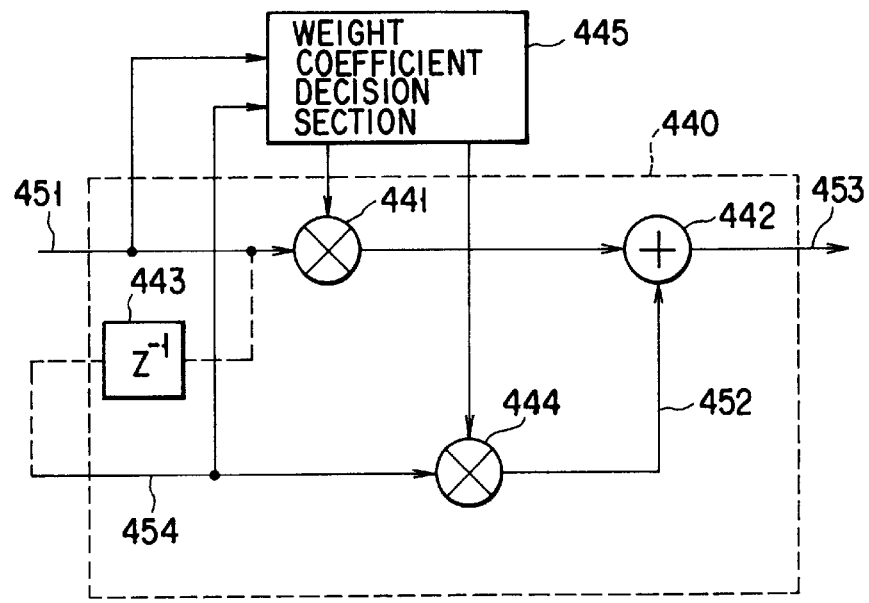
FIG. 19 is a block diagram of an image processing apparatus according to a seventh embodiment of the present invention.

FIG. 19 is a block diagram of an encoding distortion reducer, which is a picture signal processing apparatus according to a seventh embodiment of the present invention. The encoding distortion reducer receives the decoded picture signal 451 of the present frame inputted from the video decoding apparatus and the decoded picture signal 454 of the previous frame stored in the frame memory of the video decoding apparatus, causes a noncyclic-domain adaptive filter 440 to perform the encoding distortion removing process, and outputs an output picture signal 453.

The time filter 440 is composed of a first multiplier 441, an adder 442, and a second multiplier 444. The filter coefficient (called the weight coefficient) of the time filter 440 is determined by the weight coefficient decision section 445.

The first and second multipliers 441, 444 multiply the decoded picture signal 451 of the inputted present frame and the decoded picture signal 454 of the previous frame by the first and second weight coefficients supplied from the weight coefficient decision section 445, respectively. The resulting signals are inputted to the adder 442, which adds them. The output signal of the adder 442 is outputted as an output picture signal 453 from the present picture processing apparatus to an external apparatus.

The weight coefficient decision section 445 determines weight coefficients in the same manner as the weight coefficient decision section 405 in each of the first to fourth embodiments. The inter-frame difference D is calculated as the difference between the decoded picture signal 451 and the decoded picture signal 454 of the previous frame using the following equation:

$$D = \frac{1}{S(R)} \sum_{k,l \in R} |f_t(m+k, n+1) - f_{t-1}(m+k, n+1)|$$

where D: the amount of the difference $f_t$ (m, n): the pixel values of the decoded picture signal 451

$f_{t-1}$ (m, n): the pixel values of the decoded picture signal 454 of the previous frame R: D's calculation range ($-M \leq k, 1 \leq M$)

S(R): the number of pixels contained in R

As described above, with the encoding distortion reducer of the embodiment, the noncyclic time filter 440 performs the encoding distortion reducing process in place of the time-domain adaptive filter 400 used in the third to sixth embodiments. Therefore, although the performance of removing encoding distortions is a little lower than that in the third to sixth embodiments, an afterimage occurring as a result of the weighting addition of the output picture signal of the previous frame and the decoded picture signal of the present frame is minimized differently from the third to sixth embodiments. Furthermore, in the seventh embodiment, the decoded picture signal 454 of the previous frame is received from the video decoded apparatus, so a frame delay circuit need not be provided in the encoding distortion reducer, reducing the amount of hardware.

Depending on the configuration of a video decoding apparatus, however, the decoded picture signal 454 of the previous frame may not be outputted. In this case, as shown in FIG. 19, a frame delay circuit 443 that delays the decoded picture signal 451 of the present frame for one frame in time is provided in the encoding distortion reducer to produce the decoded picture signal 454 of the previous frame.

Figure 20:
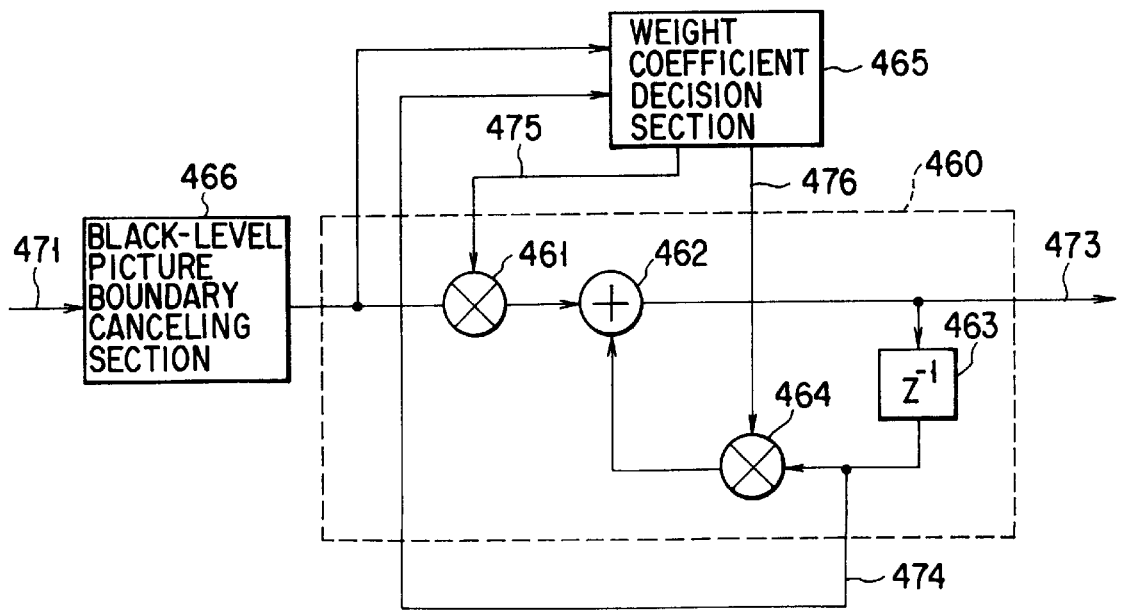
FIG. 20 is a block diagram of an image processing apparatus according to an eighth embodiment of the present invention.

FIG. 20 is a block diagram of a picture signal processing apparatus according to an eighth embodiment of the present invention. Unlike the third to seventh embodiments, the eighth embodiment is such that the video encoding apparatus suppresses noise and flicker before the compression coding of the picture signal.

An input picture signal 471 is supplied to an black-level picture boundary removing section 466, which removes from the picture signal the black level pixels existing at the boundary of the picture produced by a camera input problem, that is, the pixel signals of low-level pixels whose pixel values are smaller than a specific threshold value.

FIG. 21 is a drawing to help explain the image black edge removing process. The figure shows an example of the process of removing black-level pixels existing at the left end of the image. In FIG. 21, black circles represent black-level pixels and white circles represent pixels other than black-level pixels.

[Step 1] First, sense black-level pixels, starting from the left end of the picture. A determination whether a pixel is of black level is made by checking if the pixel value is equal to or smaller than a predetermined threshold value

[Step 2] Next, determine how many black-level pixels continue from the left end of the picture for each horizontal line. Determine the number of black-level pixels from the left end of the picture thus obtained to be Nsb.

[Step 3] Then, replace the pixel signal of a black-level pixel with the pixel signal of the pixel located Nf (a given integer) pixels on the right of the black-level pixel.

The above process will be described using an example of the topmost horizontal line in FIG. 21. There are two black-level pixels 701, 702 from the left end of the picture, so the number Nsb of black-level pixels is 2. If Nf=2, (Nsb+Nf−1) pixels 701 to 703 from the left end of the picture will be replaced with the pixel value of the Nsb-th pixel 704 from the left end of the picture.

When black-level pixels exist at the top end, right end, and bottom end of the picture, the process of replacing the pixel signals of black-level pixels with the pixel signals of other pixels as in the same manner that the processing on the pixels exiting on the left end of the picture as described above.

When the number of the pixel values of black-level pixels existing at the edge of the picture is large, performing the pixel replacing process on them would produce a sense of incongruity. To prevent this, when the number Nsb of black-level pixels is equal to or larger than a specific value, the pixel replacing process may be prevented.

In FIG. 20, the time-domain adaptive filter 460 removes noise and flicker from the picture signal subjected to the process of removing the pixel signals of black-level pixels existing at the boundary of the picture at the black level picture boundary removing section 466. The time-domain adaptive filter 460 and the weight coefficient decision section 465 that determines the filter coefficient (weight coefficient) of the time-domain adaptive filter have the same configurations as those in the third to sixth embodiments. A multiplier 461, an adder 462, a frame delay circuit 463, and a multiplier 464 function in the same manner as the multiplier 401, adder 402, frame delay circuit 403, and multiplier 404 in FIG. 11. A weight coefficient section 465 determines a weight coefficient in the same manner as the third to sixth embodiments. It is assumed, however, that the constants including W1, th1, th2, α, etc. are determined according to the nature of the input picture signal 471 or the picture signal obtained by causing the input picture signal to pass through the black-level picture boundary removing section 466.

While in the embodiment, the inter-frame difference D and activity act are found from the sum of absolute values, they may be calculated using square-sum, weighted absolute value sum, or weighted square-sum.

Activity:

Example 1:

$$act = \frac{1}{S(R)} \sum_{k,l \in R} \left( f_t(m+k, n+1) - \frac{1}{S(R)} \sum_{k,l \in R} f_t(m+k, n+1) \right)^2$$

Example 2:

$$act = \frac{1}{S(R)} \sum_{k,l \in R} wa(k, 1) \left( f_t(m+k, n+1) - \frac{1}{S(R)} \sum_{k,l \in R} f_t(m+k, n+1) \right)^2$$

Example 3:

$$act = \frac{1}{S(R)} \sum_{k,l \in R} wa(k, 1) \left| f_t(m+k, n+1) - \frac{1}{S(R)} \sum_{k,l \in R} f_t(m+k, n+1) \right|$$

Inter-frame difference:

Example 1:

$$D = \frac{1}{S(R)} \sum_{k,l \in R} (f_t(m+k, n+1) - g_{t-1}(m+k, n+1))^2$$

Example 2:

$$D = \frac{1}{S(R)} \sum_{k,l \in R} W_D(k, 1)(f_t(m+k, n+1) - g_{t-1}(m+k, n+1))^2$$

Example 3:

$$D = \frac{1}{S(R)} \sum_{k,l \in R} W_D |f_t(m+k, n+1) - g_{t-1}(m+k, n+1)|$$

where wa and $W_D$ are coefficients that give weight according to k and l.

With the image processing apparatus of the present invention, it is possible to reduce encoding distortions produced during the compression coding of the picture signal and thereby improve the quality of the decoded picture.

Furthermore, the compression coding efficiency is increased by reducing noise, flicker, and black edges existing in the picture signal to be subjected to compression coding, thereby improving the encoding quality.

FIG. 22 shows an image processing apparatus according to a ninth embodiment of the present invention. In the figure, an input terminal 811 is connected to the input of a segmentation circuit 812. The output of the segmentation circuit 812 is connected to the input of a filter controller 813 and the input of a filter 814. The signal obtained by decoding and decompressing the compression-coded picture signal into the original picture signal, is inputted to the input terminal 811.

The segmentation circuit 812 has the function of dividing the picture signal inputted from the input terminal 811 into square blocks of the same size as that in DCT coding and outputting these blocks.

The filter controller 813 receives the picture signal divided into blocks from the segmentation circuit 812, checks for a change in the density of pixels in a block, recognizes whether the change is gentle, is sharp, or includes small changes, finds the controlled value for the corresponding filter process, and output the controlled value as a control signal S.

The filter 814 is a digital filtering section that receives the control signal S from the filter controller 813 and set the filtering process and that receives the picture signal divided into blocks from the segmentation circuit 812 and performs the filtering process corresponding to the control signal S, and outputs the resulting signal.

The apparatus thus constructed operates as follows. An image signal whose picture quality has deteriorated due to encoding is inputted to the input terminal 811. The image signal whose picture quality has deteriorated due to encoding inputted from the input terminal 811 is first inputted to the segmentation circuit 812, which then divides the picture signal into small blocks. The small blocks thus divided are of the same square size as in DCT coding. The picture signal divided into blocks are inputted to the filter controller 813 and filter 814.

The filter controller 813 senses the maximum value Pmax and minimum value Pmin in the pixel values in the block and finds the difference Pdff between the maximum value Pmax and minimum value Pmin. The filter controller 813 converts the calculated difference Pdff between the maximum value and minimum value into a control signal S that controls the intensity of smoothing of the filter 814 and supplies the control signal to the filter 814. For the conversion of Pdff into control signal S, if the number of bits per pixel of the picture signal is 8, for example, the dynamic range that can be expressed by eight bits is from 0 to 255, so this gives:

$$S = (Pmax - Pmin)/255$$

This is done to suppress mosquito noise, since mosquito noise occurs in the vicinity of the edge where the difference Pdff between the maximum value Pmax and minimum value Pmin is large. Specifically, to suppress mosquito noise near the edge where the difference Pdff is large, the intensity of smoothing in the region is made higher. When the difference Pdff is large, filtering is intensified to suppress mosquito noise in the picture signal of the block.

When a filter that performs a spatial filtering process so that smoothing may be more intense as the value of S comes closer to "1," and the filtering effect may approach zero more as the value S comes closer to "0," is used as the filter 814, the maximum value is 255 and the maximum density difference is 255 for a picture with the number of bits per pixel being 8. In this case, since the denominator in the above equation is 255, S is 1. Therefore, the maximum smoothing is achieved.

In a gently changing portion, block distortions are liable to occur. Thus, the difference Pdff between the maximum value Pmax and minimum value Pmin is compared with a setting value a (e.g., about 4). When the comparison result is smaller than the setting value a, smoothing is intensified.

To do this, for example, the following equation is used:

if $((Pmax-Pmin)<a) S=0.5$

Specifically, when Pmax−Pmin<a holds as a result of comparison of Pmax−Pmin with the setting value a, S is determined to be, for example, 0.5. The value of 0.5 is outputted as control signal S, which is supplied to the filter 14. The setting value a was set at 4 and the value of control signal S was set at 0.5, which were experimental values. With these values, the satisfied result was obtained. When the characteristic of a filter to be used is different, the setting value and the value of control signal S are set to the optimum values, regardless of the above values, taking into account the filter effect actually produced.

What has been explained above is the control signal acquisition process for reducing block distortions and mosquito noise (a first control signal acquisition process).

Even if block distortions and mosquito noise have been reduced, the loss of fine texture leads to the deterioration of picture quality. To prevent this, the following control signal is obtained as explained below (a second control signal acquisition process).

When the difference Pff between the maximum value Pmax and minimum value Pmin is large and the picture contains fine texture, intense smoothing may level out the fine texture. A signal shown in FIG. 25 is taken as example. In this case, the signal with a small amplitude is not an encoding distortions but a texture included in the original picture.

In the case of such a picture, the average of the pixel values in the block is determined to be 0 and the number of zero-crossings of the video data (data value) is counted in order not to lose fine textures. To make smoothing less intense as the count NZC is larger, the following equation is satisfied:

$S=(Pmax-Pmin)/(255(b+NZC))$ where b is a constant. The b is set at about 20, which is an experimental value. This value produced a good result. Depending on the characteristic of a filter to be used, another value may be better, so the optimum value may be selected by actually trying various values according to a filter to be used.

The fine texture screen can be given a control signal S that makes smoothing less intense according to the fineness by such calculations. To deal with block distortions and mosquito noise as well, the filter controller 14 is provided with the function of counting the number of zero-crossings of the picture signal (data value) and determining on the basis of the resulting count whether the result of the second control signal acquisition process or the first control signal acquisition process is determined to be output control signal.

Alternatively, the control function may be such that the result of the first control signal acquisition process is mixed with the second control signal acquisition process with a specific ratio according to the count.

The control signal S thus obtained at the filter controller 813 is sent to the filter 11, which performing the smoothing process on the picture signal obtained from the input terminal 811, while changing the intensity of smoothing according to the control signal S.

Then, the decoded picture signal whose picture quality has deteriorated due to encoding is checked for a change in the density between pixels in the block size in the DCT processing during encoding. Then, a control signal for performing the optimum filtering according to the density change is found. With the intensity corresponding to the magnitude of the control signal S, smoothing is effected. The resulting signal is outputted at the output terminal 815.

Accordingly, in a place where the density changes gently, when the change is smaller than a specific setting value, intense smoothing is effected to prevent block distortions from occurring. When the density difference is large, smoothing is done with the intensity corresponding to the amount of the difference to alleviate mosquito noise. In the case of a picture containing fine texture, the picture is subjected to the optimum filtering process in order not to lose the fine texture, thereby producing a picture whose picture quality deterioration has been alleviated.

Some examples of the method of constructing the filter 814 capable of changing the intensity of smoothing of the filter will be shown.

One method of changing the intensity of smoothing of the filter is a method of mixing the filtered signal with the unfiltered signal with the ratio corresponding to the value of the control signal S.

Figure 23:
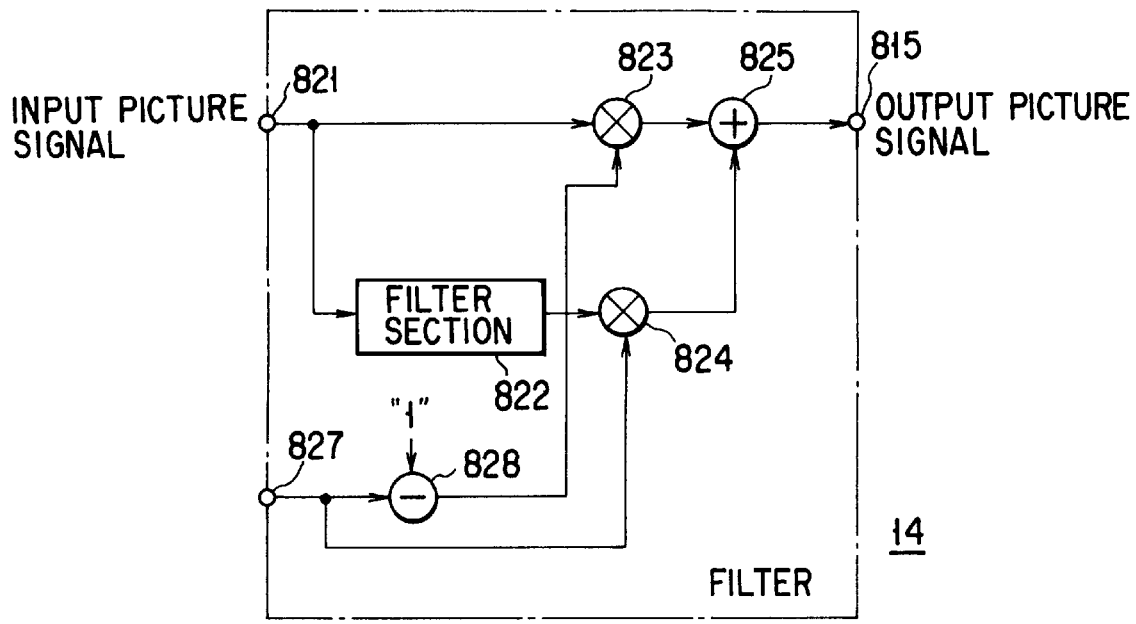
FIG. 23 is a block diagram of an example of a filter used in the image processing apparatus of FIG. 22.

FIG. 23 shows the configuration of the filter 814 to which the above method is applied. The filter is composed of a filter section 822 that performs intense smoothing, multipliers 823, 824, an adder 825, and a subtracter 828. An input terminal 821 receives the decoded blocked picture signal from the segmentation circuit 812. An output terminal 815 outputs the filtered picture signal. An input terminal 827 is an input terminal for control signal S.

The filter section 822 filters the picture signal from the input terminal 821. The subtracter 828 subtracts the control signal S from the input terminal 827 from "1." The multiplier 823 multiplies the picture signal from the input terminal 821 by the subtraction result from the subtracter 828. The multiplier 824 multiplies the output of the filter section 822 by the control signal S from the input terminal 827. The adder 825 adds the output of the multiplier 823 to the output of the multiplier 824 and outputs the result to the output terminal 815.

With this circuit, the segmented picture signal, or the output of the segmentation circuit 821, is supplied from the input terminal 821. The control signal S, the output of the filter controller 813, is supplied from the input terminal 827. Then, the picture signal supplied from the input terminal 821 is inputted to the filter section 822, which effects the intense filtering of the picture signal. The picture filtered and outputted from the filter section 822 is a picture that has undergone the most intense smoothing process set in the filter.

On the other hand, the control signal S, the output of the filter controller 813, supplied from the input terminal 827 is inputted to the subtracter 828. The subtracter is given "1" as a value from which a certain value is to be subtracted. The subtracter 828 subtracts the control signal S from "1" and determines the difference to be the mixing ratio of the unfiltered signal.

Furthermore, the picture signal from the input terminal 821 is also supplied to the multiplier 823, which multiples the picture signal by (1−S), which is the mixing ratio of the unfiltered signal obtained at the subtracter 828. The multiplication result is given to the adder 825.

The control signal S, the output of the filter controller 813, supplied from the input terminal 827 is also supplied as a multiplicator to the multiplier 824, to which the filtered picture signal is supplied as a multiplicand from the filter section 822. The multiplier 824 multiplies the control signal S by the filtered picture signal and supplies the resulting signal to the adder 825. If the control signal takes a value in the range from 1 to 0, the multiplication result of the multiplier 824 corresponds to the mixing ratio of the control signal S to the filtered signal. The adder 825 adds the output of the multiplier 824 to the output of the multiplier 823 and the resulting signal is outputted at the output terminal 815.

Thus, the output of the adder 825 that adds the output of the multiplier 824 to the output of the multiplier 823 is a picture signal obtained by mixing the filtered picture signal with the unfiltered picture signal with the mixing ratio determined by the control signal S. Therefore, a space filter that performs filtering with the intensity of smoothing corresponding to the control signal S is obtained.

Another method of constructing a filter 814 capable of changing the intensity of smoothing is to use a cyclic variable weight coefficient filter. With this method, the intensity of the filter is controlled in pixels, so only encoding distortions can be smoothed, with the edge being preserved.

Figure 24:
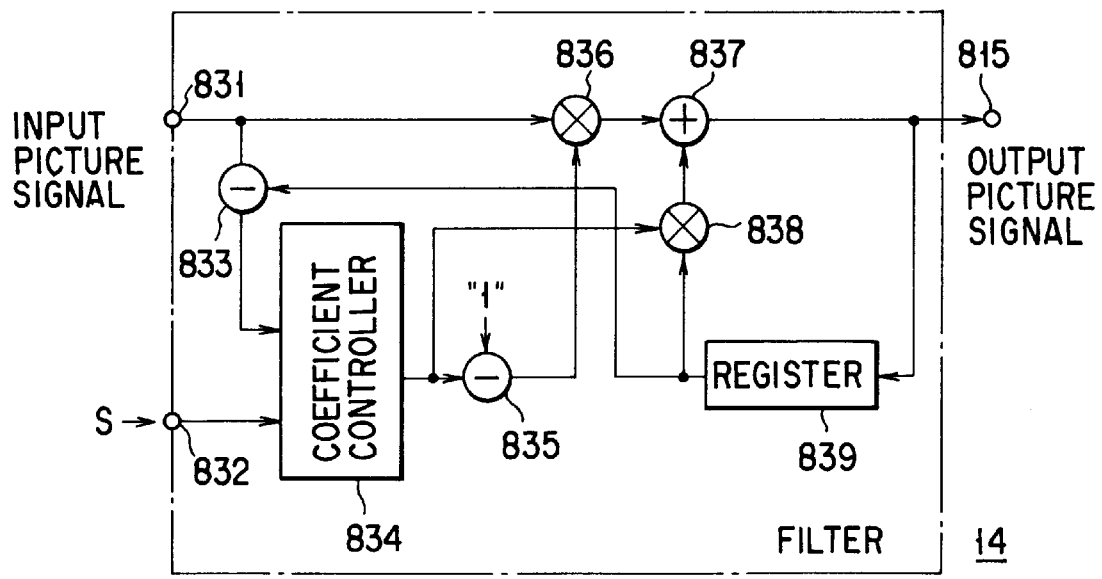
FIG. 24 is a block diagram of another example of the filter used in the image processing apparatus of FIG. 22.

The cyclic variable weight coefficient filter will be explained. As shown in FIG. 24, the filter is composed of difference units 833 and 835, a coefficient controller 834, multipliers 836 and 838, an adder 837, and a register 839. An input terminal 831 receives the segmented picture signal or the output of the segmentation circuit 812. An input terminal 832 receives the control signal S from the filter controller 813. The control signal S is supplied via the input terminal 832 to the coefficient controller 834. The filtered picture signal is outputted at the output terminal 815.

The register 839 holds the filtered picture signal temporarily. The register receives the output of the adder 837 pixel by pixel and updates and holds these pixels.

The difference unit 833 calculates the difference between the picture signal (in pixels) from the input terminal 831 and the picture signal (the pixels before one pixel) held in the register 839. The coefficient controller 834 receives the difference and control signal S, carries out specific calculations, and finds the weight coefficient C of the pixels.

The difference unit 835 subtracts the weight coefficient C computed at the coefficient controller 834 from "1." The multiplier 836 multiplies the picture signal from the input terminal 831 by the value found at the difference unit 835. The multiplier 838 multiplies the picture signal held in the register 839 by the weight coefficient C obtained by the coefficient controller 834. The adder 837 adds the output of the multiplier 836 to the output of the multiplier 838.

With this configuration, the segmented picture signal is supplied from the input terminal 831 to the weight coefficient controller 834. The output signal S of the filter controller 813 is supplied from the input terminal 832 to the weight coefficient controller 834. The difference D between the input picture signal and the processed pixel value before one pixel is computed at the difference unit 833. The difference D is also supplied to the weight coefficient controller 834.

The coefficient controller 834 computes the weight coefficient C of the filter using the following equation:

$$C = U2/(D2+2U2)$$

If the number of bits per pixel is 8, U=255*S will hold.

Specifically, from the equation, in the range from 0.5 to 0, the larger the difference D, the smaller the weight coefficient C and the larger the control signal S, the larger the weight coefficient C. The multiplier 836 multiplies the input picture signal by the difference from the weight coefficient C ((input picture signal)*(1−C)). The multiplier 838 multiplies the processed pixel value before one pixel by weight coefficient C. The adder 837 adds the output of the multiplier 836 to the output of the multiplier 838. The resulting signal is outputted at the output terminal 815. The addition result is stored in the register 839 and is used as a preprocessing pixel value. Therefore, a space filter that performs filtering in pixels with the intensity of smoothing corresponding to the control signal S is obtained.

As described in detail, the apparatus of the present invention comprises a circuit unit for dividing an input picture signal into a plurality of blocks, a filter controller that computes the difference between the maximum and minimum of the pixel values in the block, make smoothing more intense as the difference between the maximum value and the minimum value, and produces a signal that makes smoothing more intense when the difference between the maximum and minimum values is smaller than a setting value, and filtering means (a space filter for smoothing) that filters the input picture signal, while changing the intensity of smoothing according to the signal of the filter controller.

Furthermore, the apparatus of the invention comprises a circuit that divides the input picture signal into a plurality of regions corresponding to the divided blocks at the time of orthogonal transform in the encoding process, filter control means that counts the number of zero-crossings in a case where the average value of the region is determined to be 0, or the number of maximal values, or the number of minimal values, and produces a signal that makes smoothing less intense as the number of zero-crossings, the number of maximal values, or the number of minimal values, and a filter circuit that changes the intensity of smoothing according to the signal from the filter controller.

Therefore, when the compression-coded picture signal is decompressed and reproduced, block distortions occurring in the picture with a gentle change in the pixel density and mosquito noise (distortions like a blur) near the outline are alleviated. By adjusting the degree of smoothing according to a change in the pixel density, fine textures having high spatial frequencies is prevented from disappearing. In this way, encoding distortions are suppressed without impairing the original picture and therefore the picture quality is improved remarkably.

The present invention is not limited to the above embodiments, for instance, by limiting the contents of control which the filter controller 813 that finds the controlled value of smoothing degree from the pixel density is supposed to do, a filter unit designed for a single effect, such as reducing only block distortions or mosquito noise, is achieved.

With the above embodiment, for the picture whose picture quality has deteriorated due to encoding, the degree of encoding distortions varies with the local characteristic of the picture. By controlling the intensity of smoothing of a filter according to the local characteristic of the picture, encoding distortions are suppressed without impairing the characteristic of the original picture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

time filter means for performing a filtering process on an input video signal with respect to time according to a specific filter coefficient and outputting an output video signal; and filter coefficient decision means for determining the filter coefficient of the time filter means according to an amount of the difference between the input video signal and a first signal obtained by delaying the output video signal or a second signal obtained by delaying the input video signal and an evaluation value indicating a complexity of the input video signal.

2. An image processing apparatus comprising:

low-level pixel signal removing means for removing, from an input video signal, pixel signals of low-level pixels which exist at a picture boundary and have pixel values smaller than a threshold value;

time filter means for performing a filtering process with respect to time according to a specific filter coefficient on the input video signal processed by the low-level pixel signal removing means and for outputting an output video signal; and filter coefficient decision means for determining the filter coefficient of the time filter means according to at least an amount of a difference between the input video signal processed by the low-level pixel signal removing means and a first signal obtained by delaying the output video signal or a second signal obtained by delaying the input video signal.

3. An image processing apparatus according to claim 2, wherein the filter coefficient decision means includes means for determining the filter coefficient, taking into account an evaluation value indicating a complexity of the input video signal.

4. An image processing apparatus according to claim 2, wherein the low-level signal removing means detects low-level pixels having pixel values smaller than the threshold value from the input video signal, finds how many low-level pixels are at the picture boundary, and removes the pixel signals of the low-level pixels existing at the picture boundary by displacing the pixel values of the low-level pixels with other pixel values other than those of the low-level pixels determined by the number of low-level pixels.

5. An image processing apparatus comprising:

means for receiving as an input video signal a video signal obtained by decoding encoded data which is obtained from a video encoding apparatus with a plurality of encoding modes, using a video decoding apparatus;

time filter means for performing a filtering process on the input video signal in time-domain according to a specific filter coefficient and outputting an output video signal; and filter coefficient decision means for determining the filter coefficient of the time filter means according to an amount of the difference between the input video signal and a first signal obtained by delaying the output video signal or a second signal obtained by delaying the input video signal and the encoding modes of the video encoding apparatus, the encoding modes being selected in accordance with whether the encoded data includes a refresh coded picture or another coded picture.

6. An image processing apparatus comprising:

a time-domain adaptive filter which receives a decoded picture signal as an input picture signal and performs a filtering process on the input picture signal with respect to time according to a specific filter coefficient, to output an output picture signal; and a filter coefficient decision section which determines the filter coefficient of the time-domain adaptive filter according to an amount of a difference between the input picture signal and a first signal obtained by delaying the output picture signal or a second signal obtained by delaying the input video signal and an evaluation value indicating a complexity of the input picture signal.

7. An image processing apparatus according to claim 6, wherein the time-domain adaptive filter comprises a first multiplier which multiplies the input picture signal by a first weight coefficient to obtain a first weighted picture signal, a frame delay circuit which delays the output picture signal for at least one picture to output a delay picture signal, a second multiplier which multiplies the delay picture signal by a second weight coefficient to obtain a second weighted picture signal, and an adder which adds the first weighted picture signal and the second weighted picture signal to output the output picture signal.

8. An image processing apparatus according to claim 7, wherein the weight coefficient decision section includes a section which determines the first weight coefficient and the second weight coefficient on the basis of the input picture signal and the delay picture signal.

9. An image processing apparatus according to claim 7, wherein the weight coefficient decision section comprises an inter-frame difference calculator which calculates the amount of the difference between the input picture signal and the delay picture signal and a weight coefficient calculator which calculates the first weight coefficient and the second weight coefficient from the amount of the difference calculated, the first weight coefficient and the second weight coefficient having first values when the amount of the difference is less than a first constant value, and second values smaller than the first values when the amount of the difference has a second constant value not less than the first constant value.

10. An image processing apparatus according to claim 7, wherein the weight coefficient decision section has a section which changes a characteristic indicating a relationship between the amount of the difference and the weight coefficient according to a signal indicating at least one of an encoding mode and a motion vector.

11. An image processing apparatus according to claim 7, wherein the weight coefficient decision section has an activity calculator which computes an activity of the input picture signal, a threshold calculator which produces threshold values changing in accordance with the activity corresponding to the evaluation value indicating the complexity of the input video signal, an inter-frame difference calculator which calculates the amount of the difference between the input picture signal and the delay picture signal, and a weight coefficient calculator which determines the first weight coefficient and the second weight coefficient from the amount of the difference and the threshold values.

12. An image processing apparatus according to claim 7, wherein the time-domain adaptive filter comprises a spatial filter which subjects the output picture signal from the adder to a spatial filtering to remove encoding distortions from the output picture signal.

13. An image processing apparatus according to claim 6, wherein the time-domain adaptive filter comprises a first multiplier which multiplies the input picture signal by a first weight coefficient to obtain a first weighted picture signal, a frame delay circuit which delays the input picture signal for at least one picture to output a delay picture signal, a second multiplier which multiplies the delay picture signal by a second weight coefficient to obtain a second weighted picture signal, and an adder which adds the first weighted picture signal and the second weighted picture signal to output the output picture signal.

14. An image processing apparatus comprising:

a low-level pixel signal removing section which removes, from an input video signal, pixel signals of low-level pixels which exist at a picture boundary and have pixel values smaller than a threshold value;

a time-domain adaptive filter which receives a decoded picture signal as an input picture signal and performs a filtering process with respect to time according to a specific filter coefficient on the input video signal processed by the low-level pixel signal removing section and outputs an output video signal; and a filter coefficient decision section which determines the filter coefficient of the time-domain adaptive filter according to at least an amount of a difference between the input video signal processed by the low-level pixel signal removing section and a first signal obtained by delaying the output video signal or a second signal obtained by delaying the input video signal.

15. An image processing apparatus according to claim 14, wherein the filter coefficient decision section includes a section which determines the filter coefficient in accordance with an evaluation value indicating a complexity of the input video signal.

16. An image processing apparatus according to claim 14, wherein the low-level signal removing section includes a detection section which detects low-level pixels having pixel values smaller than the threshold value from the input video signal, finds how many low-level pixels are at the picture boundary, and removes the pixel signals of the low-level pixels existing at the picture boundary by displacing the pixel values of the low-level pixels with other pixel values other than those of the low-level pixels determined by the number of low-level pixels.

17. An image processing apparatus comprising:

a section which receives as an input video signal a video signal obtained by decoding encoded data which is obtained from a video encoding apparatus with a plurality of encoding modes, using a video decoding apparatus, a time filter which filters the input video signal in time-domain according to a specific filter coefficient to output an output video signal; and a filter coefficient decision section which determines the filter coefficient of the time filter means according to an amount of a difference between the input video signal and a first signal obtained by delaying the output video signal or a second signal obtained by delaying the input video signal and the encoding modes of the video encoding apparatus, the encoding modes being selected in accordance with whether the encoded data includes a refresh coded picture or another coded picture.

* * * * *